Dec. 2, 1930.  L. D. SOUBIER  1,783,201
GLASSWARE FORMING MACHINE
Filed June 30, 1927   17 Sheets-Sheet 1
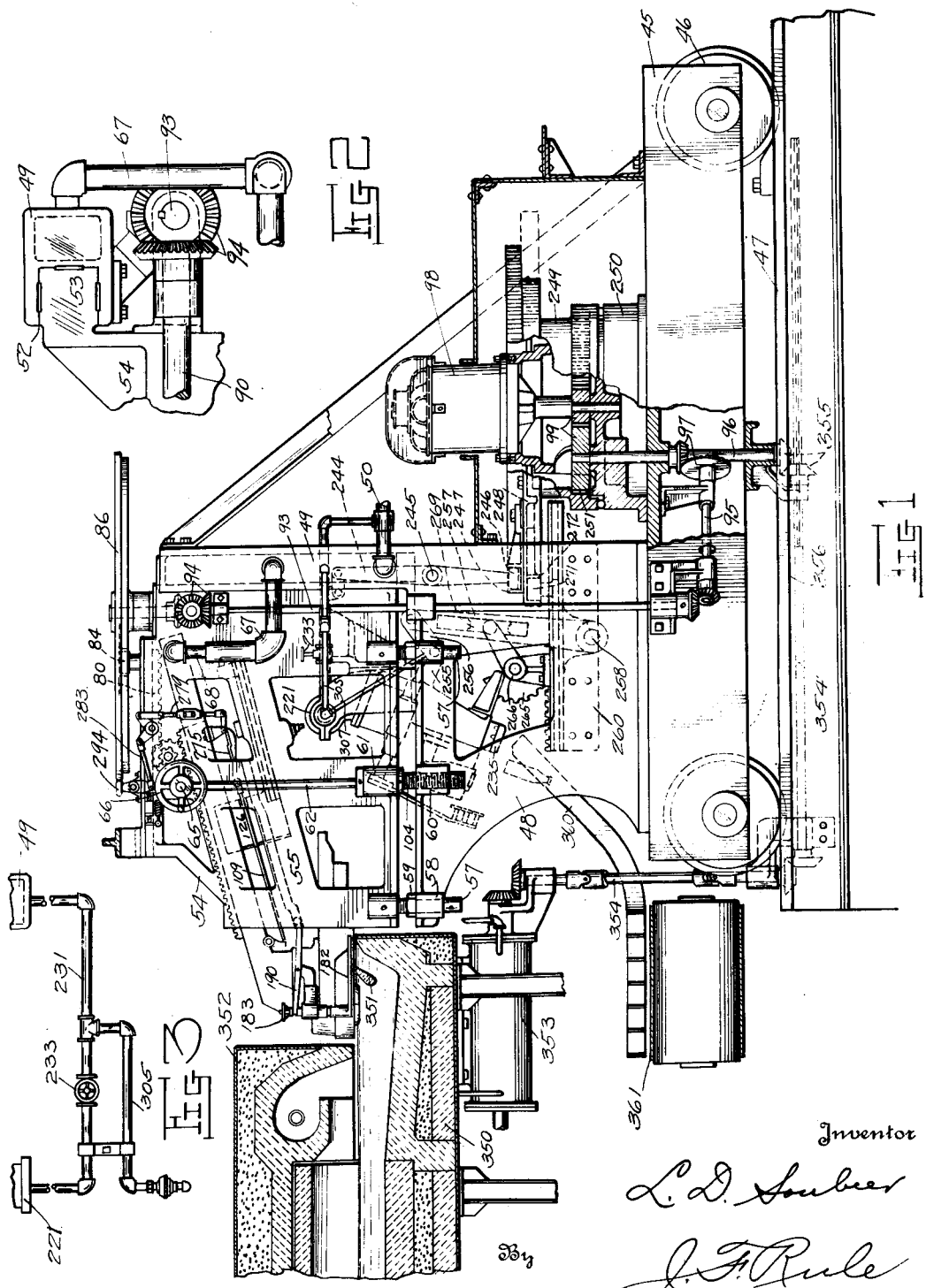
Inventor
L. D. Soubier
By J. F. Rule
Attorney

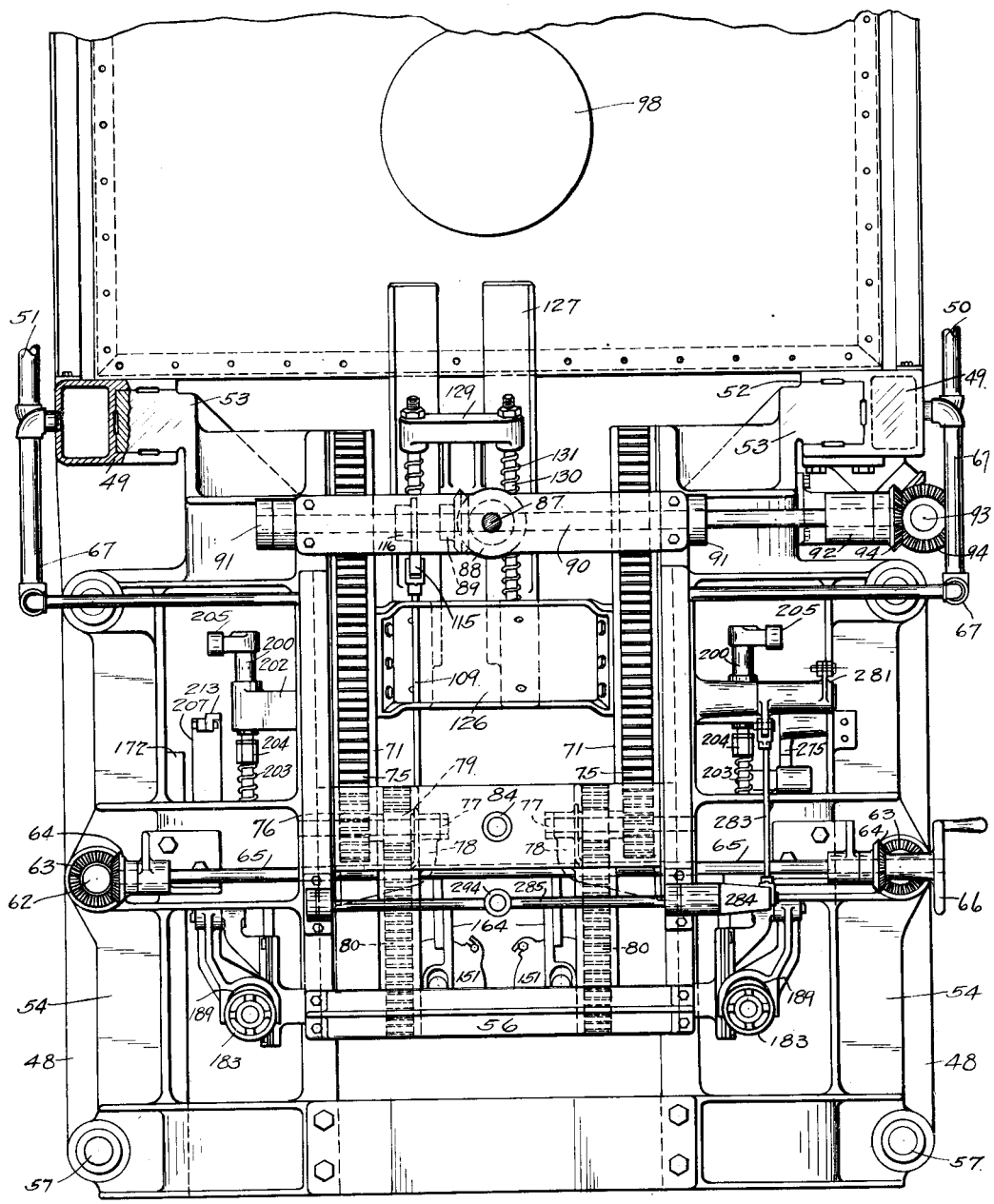

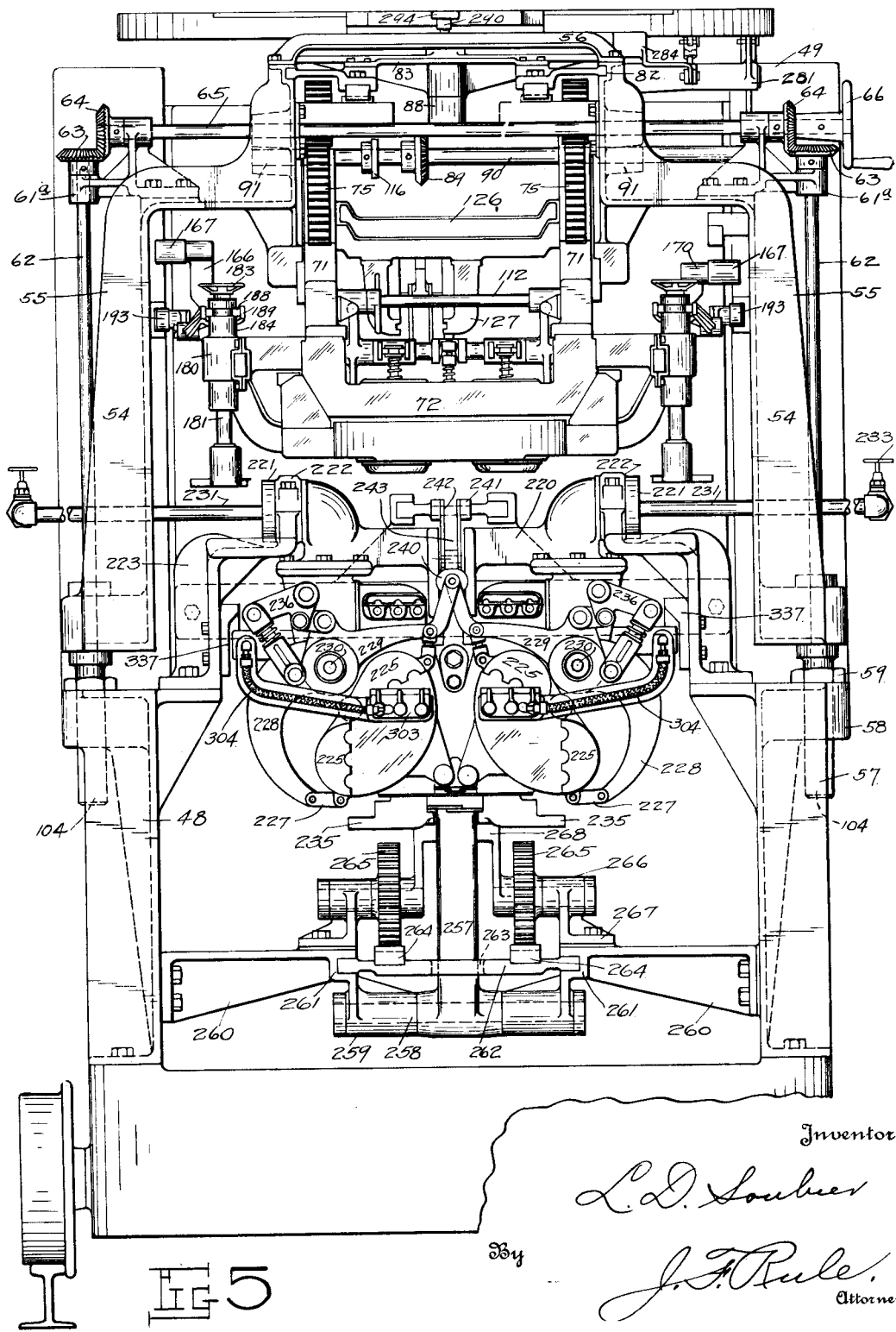

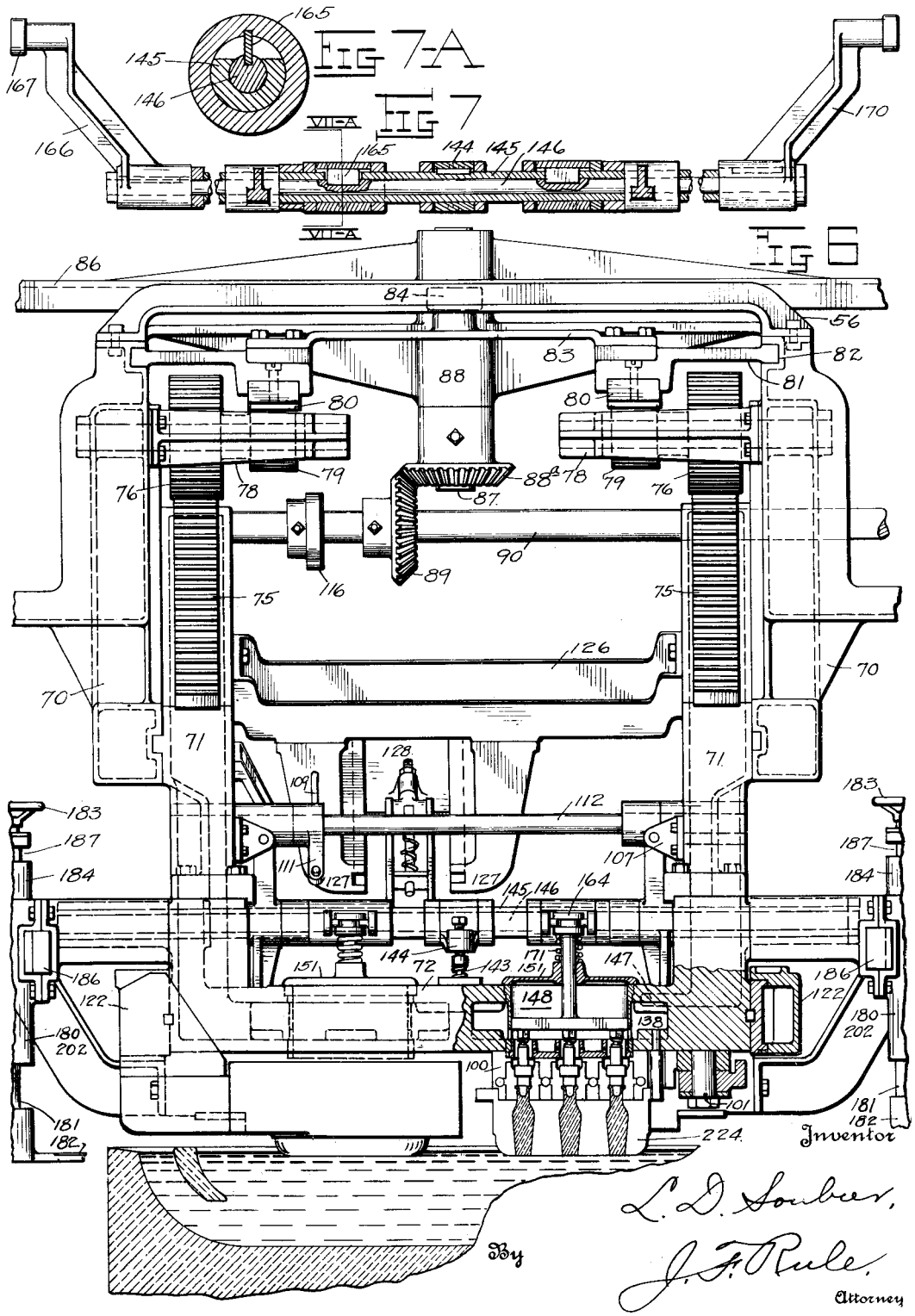

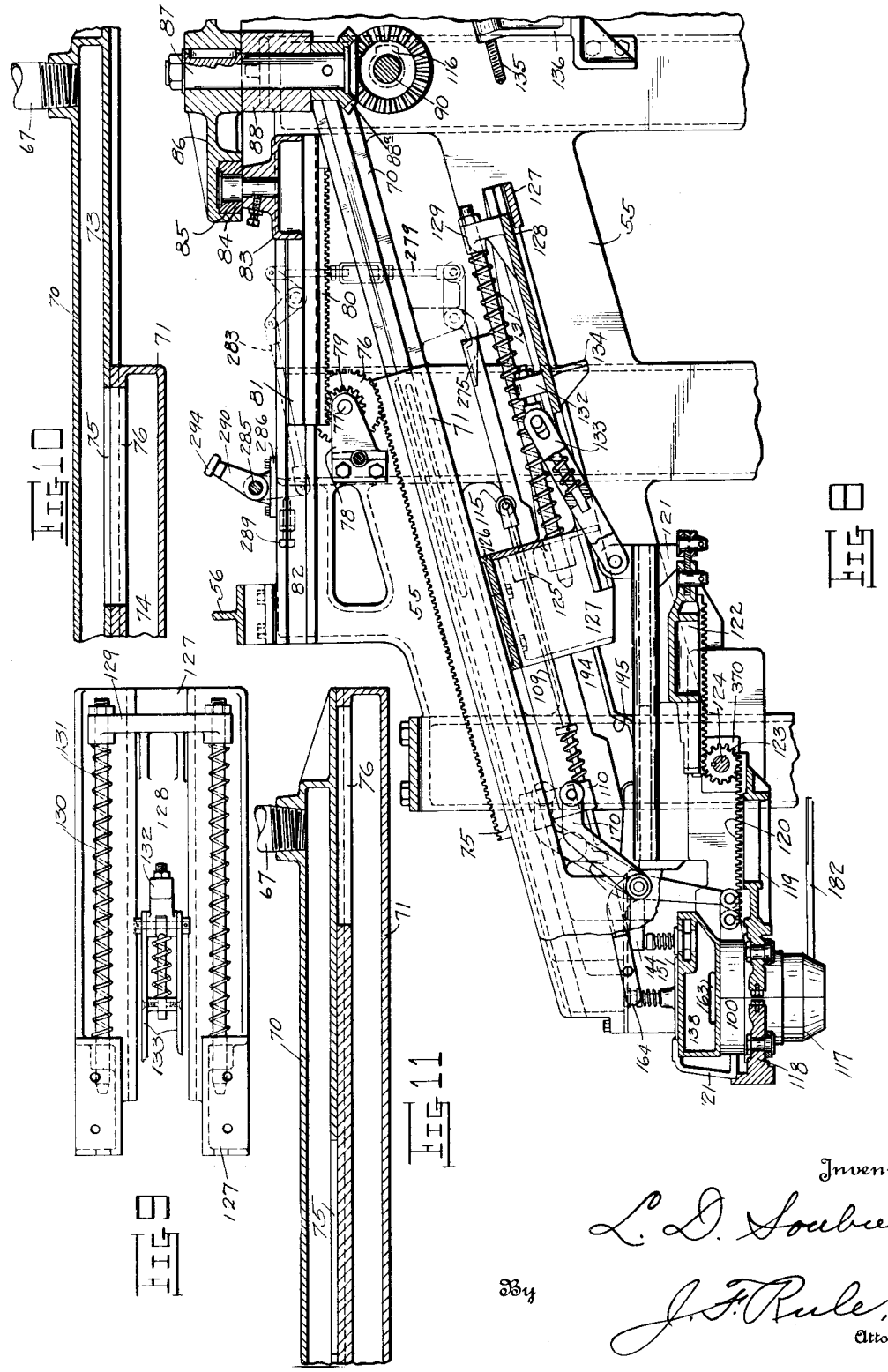

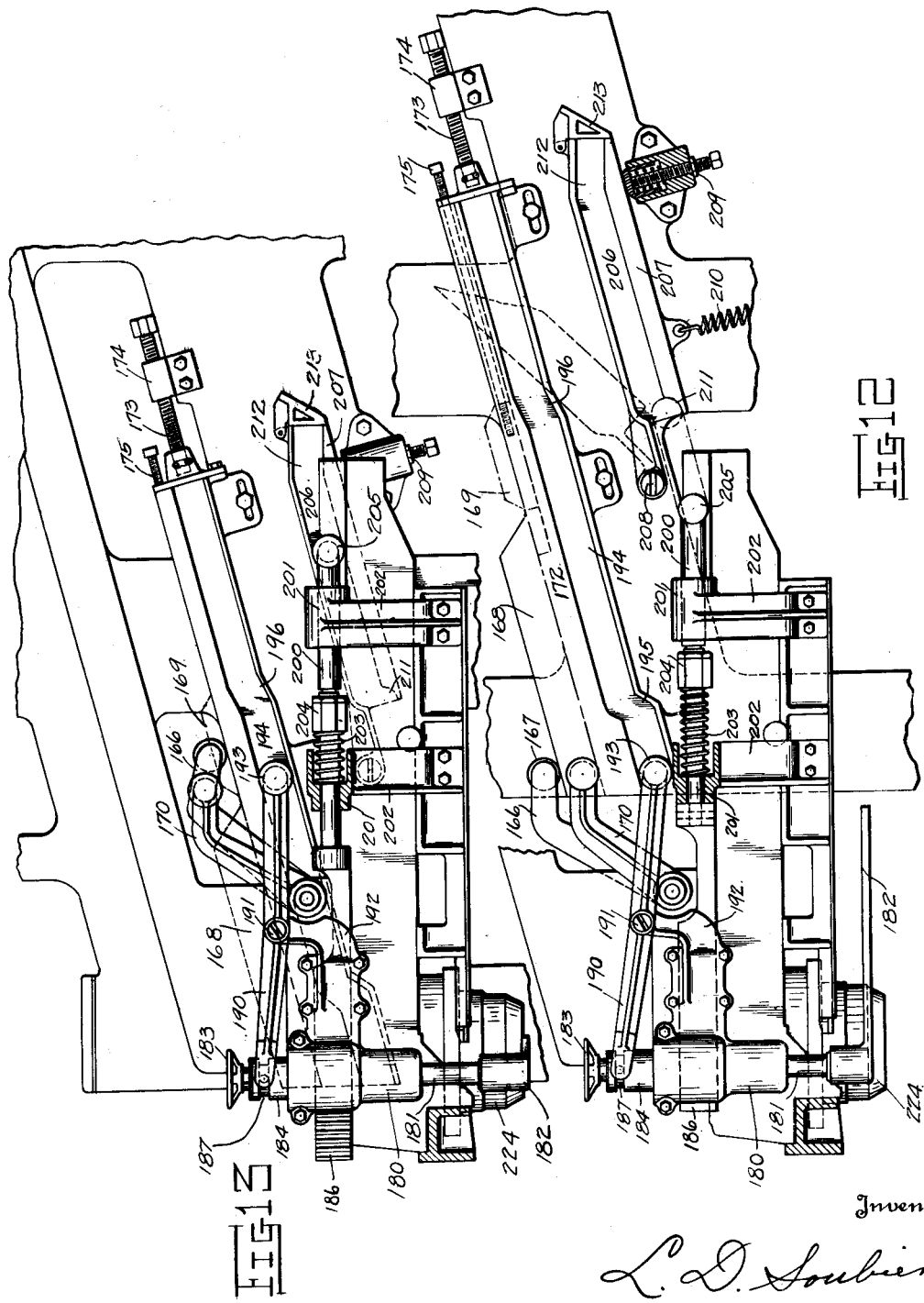

Dec. 2, 1930.       L. D. SOUBIER       1,783,201
GLASSWARE FORMING MACHINE
Filed June 30, 1927       17 Sheets-Sheet 7
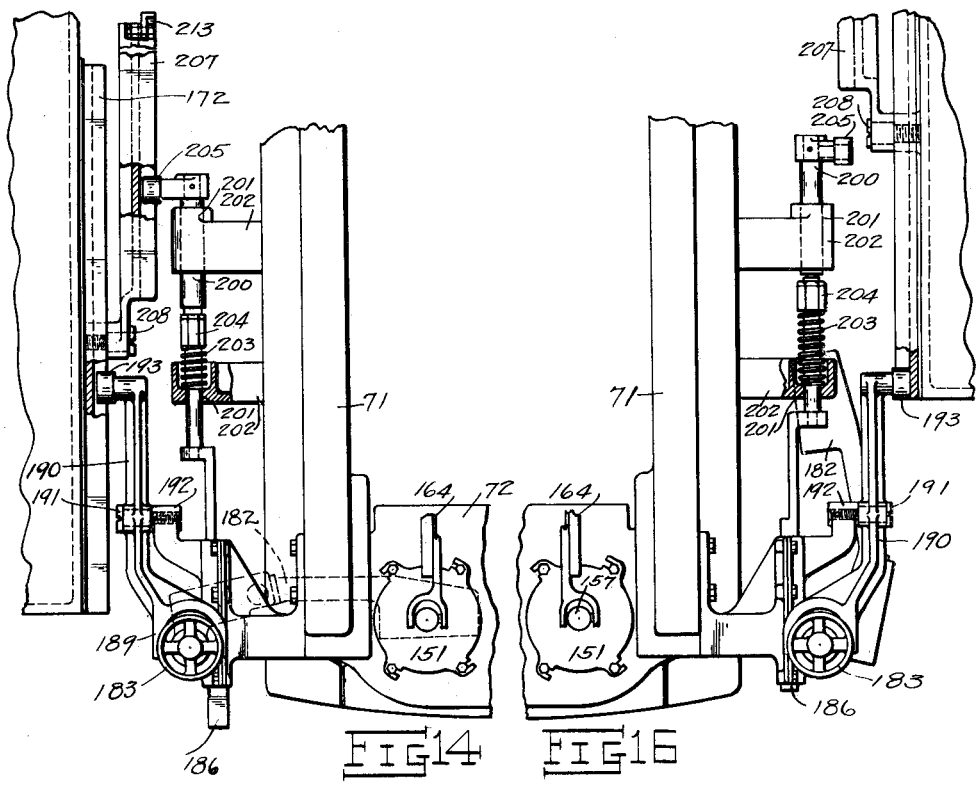
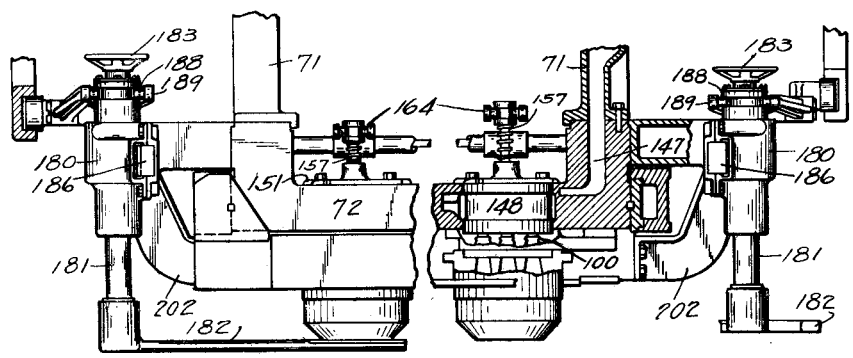
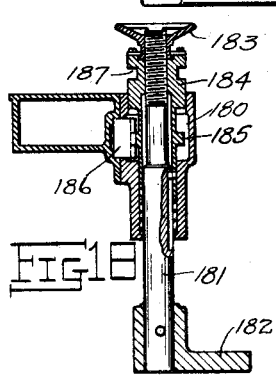
Inventor
L. D. Soubier
By
J. F. Rule.
Attorney Dec. 2, 1930.　　　　L. D. SOUBIER　　　　1,783,201
GLASSWARE FORMING MACHINE
Filed June 30, 1927　　　17 Sheets-Sheet 8
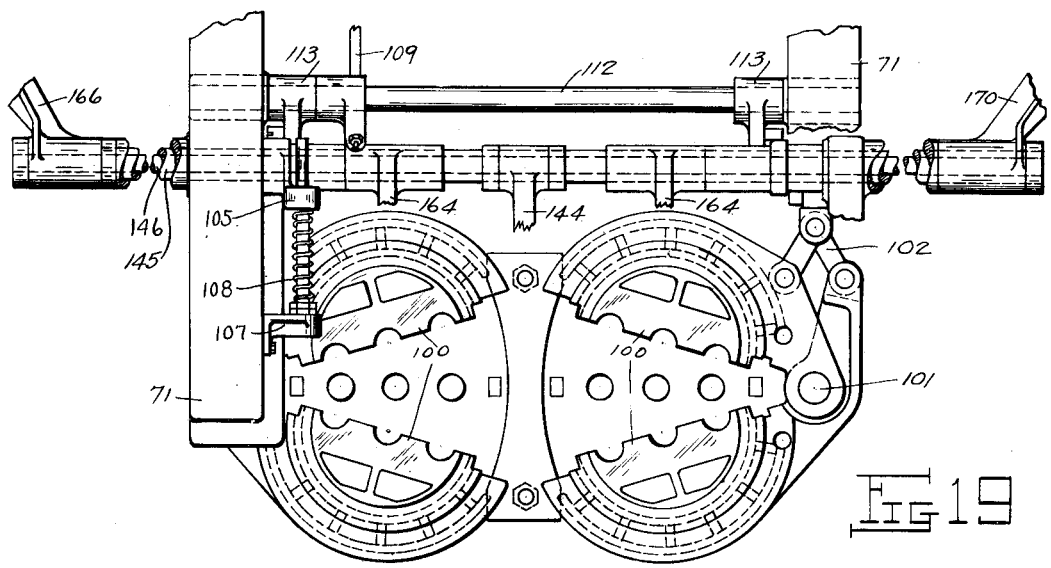
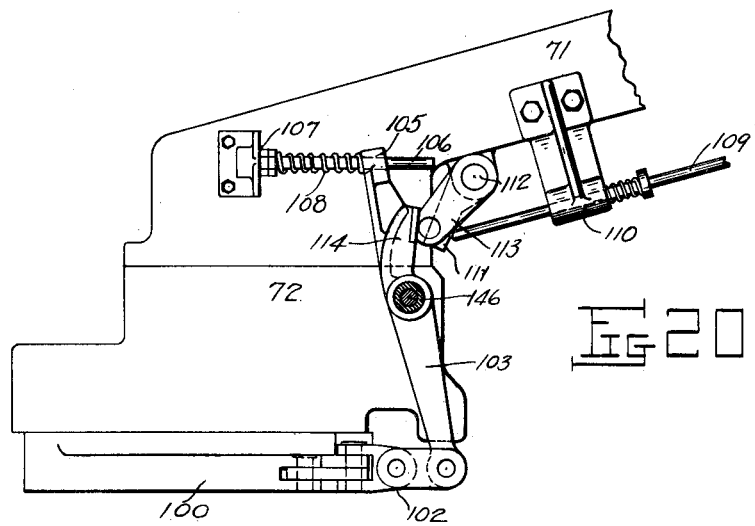
Inventor
L. D. Soubier
By J. F. Rule,
Attorney

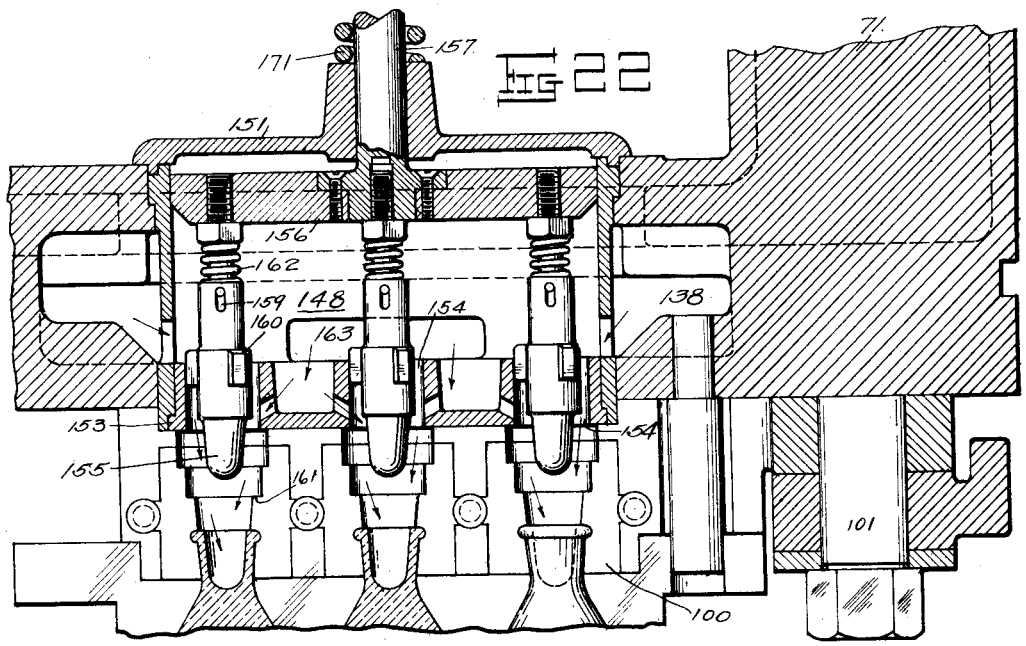
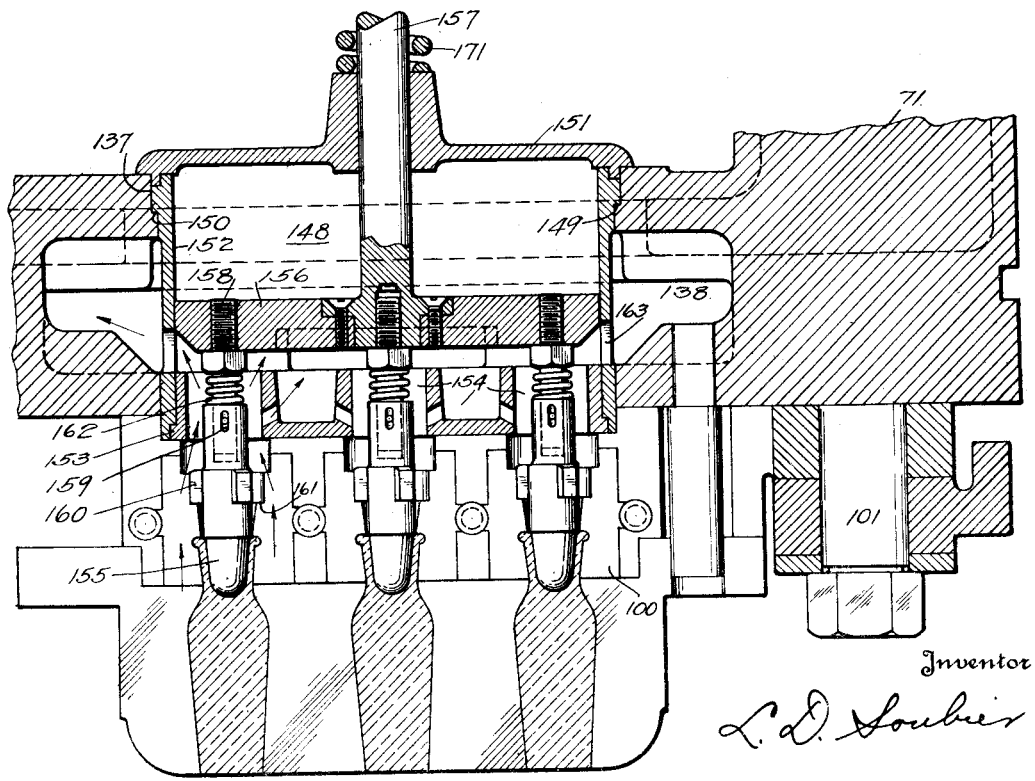

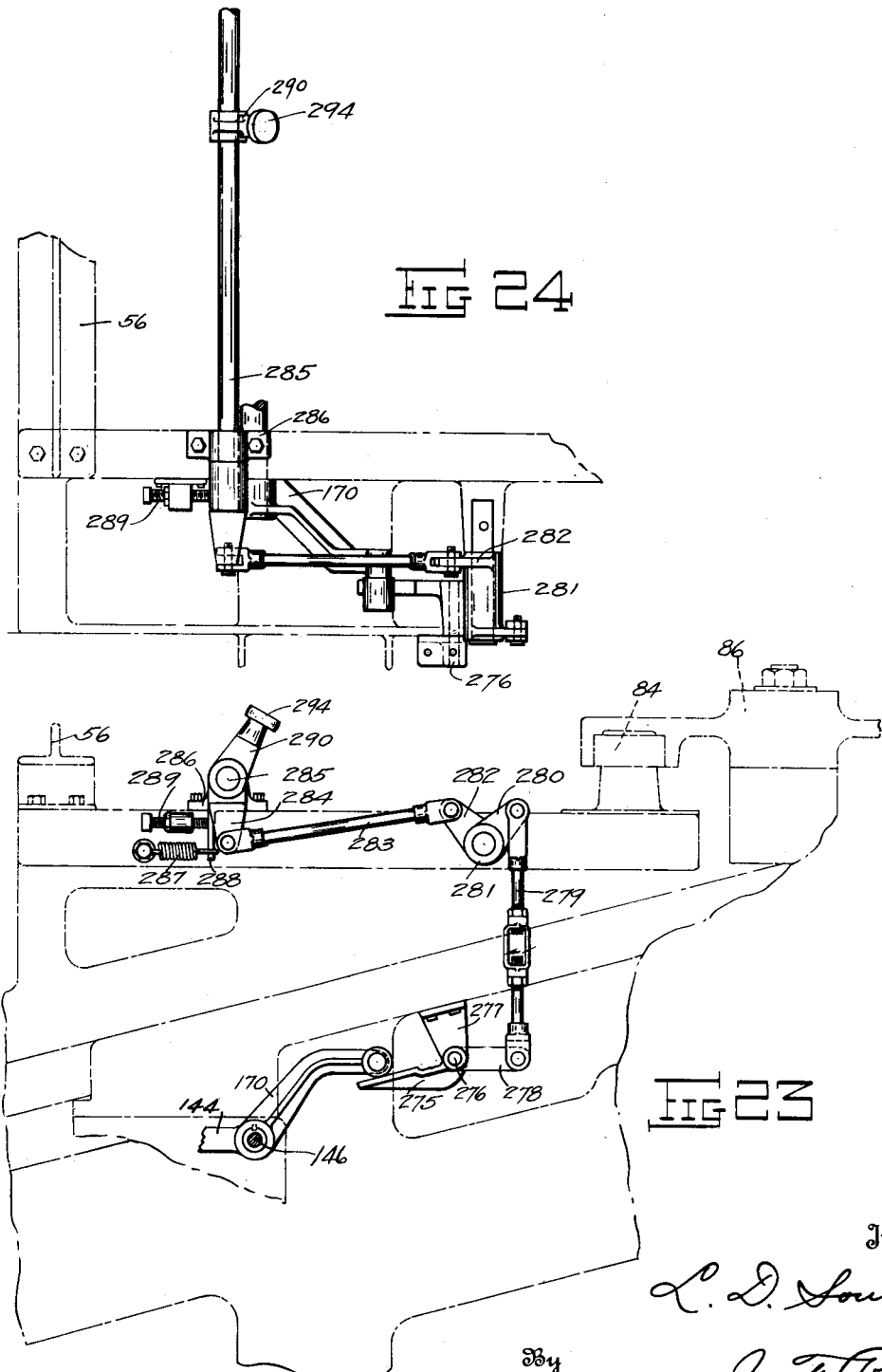

Dec. 2, 1930.   L. D. SOUBIER   1,783,201
GLASSWARE FORMING MACHINE
Filed June 30, 1927   17 Sheets-Sheet 11
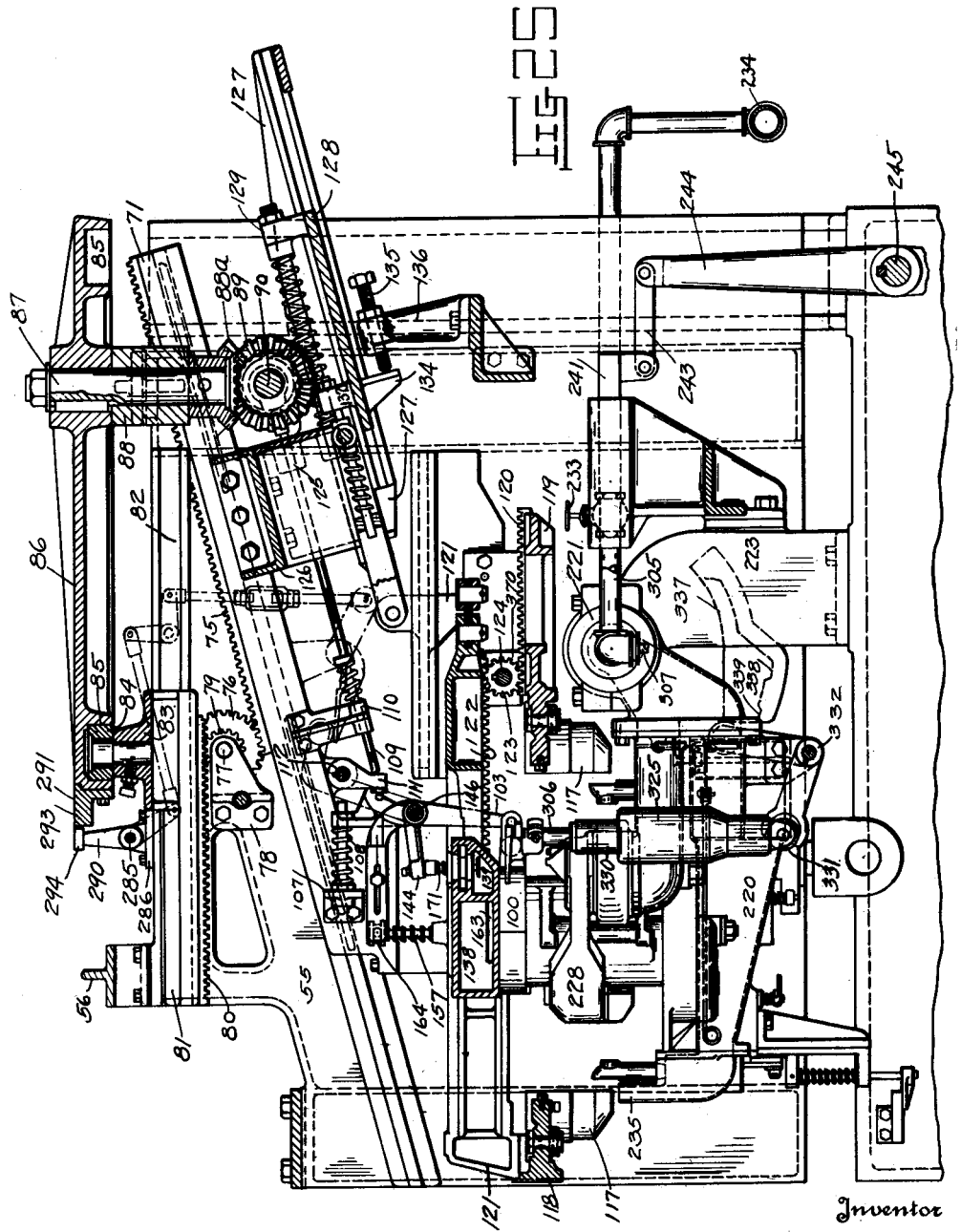
Inventor
L. D. Soubier
By
J. F. Rule.
Attorney

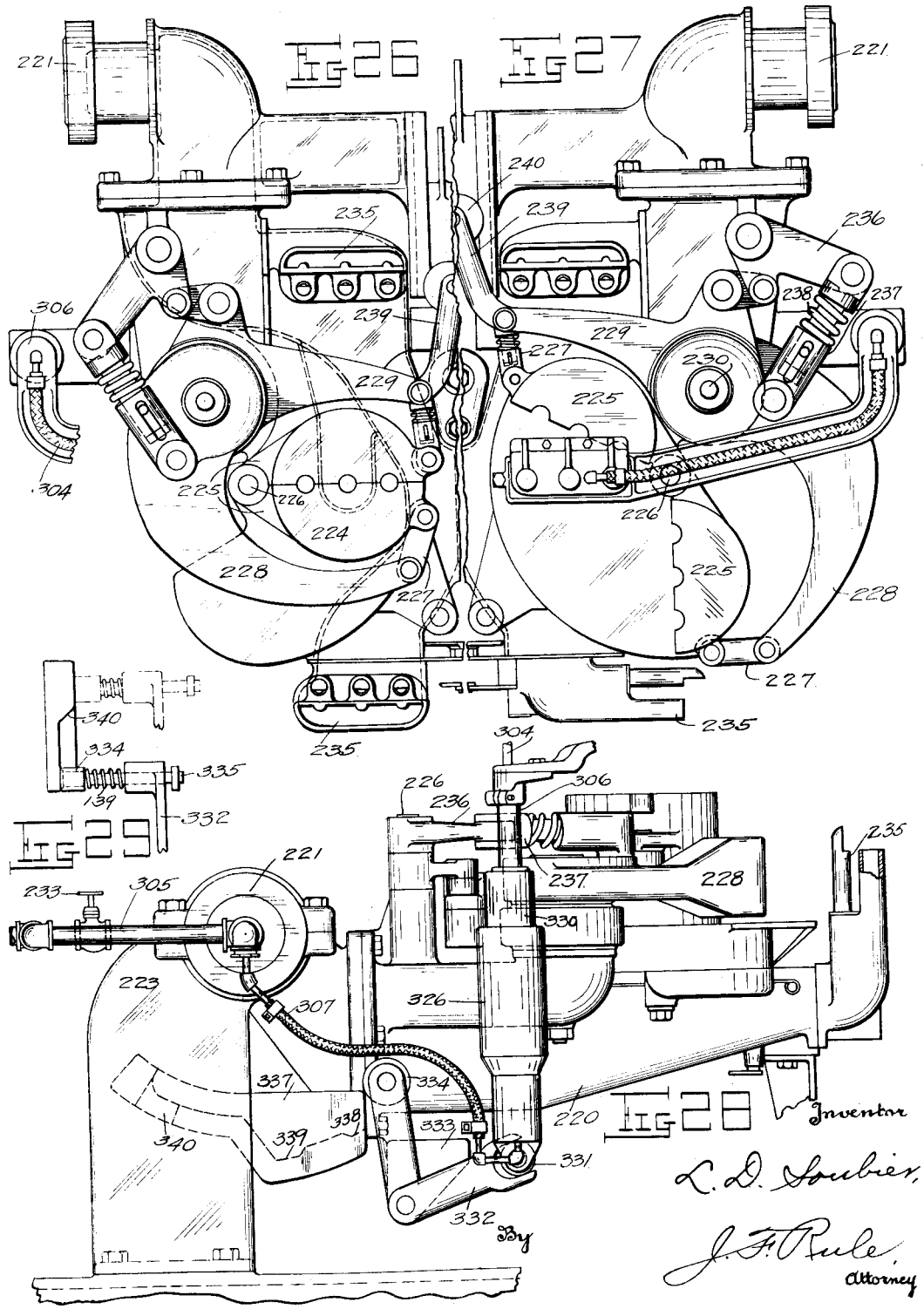

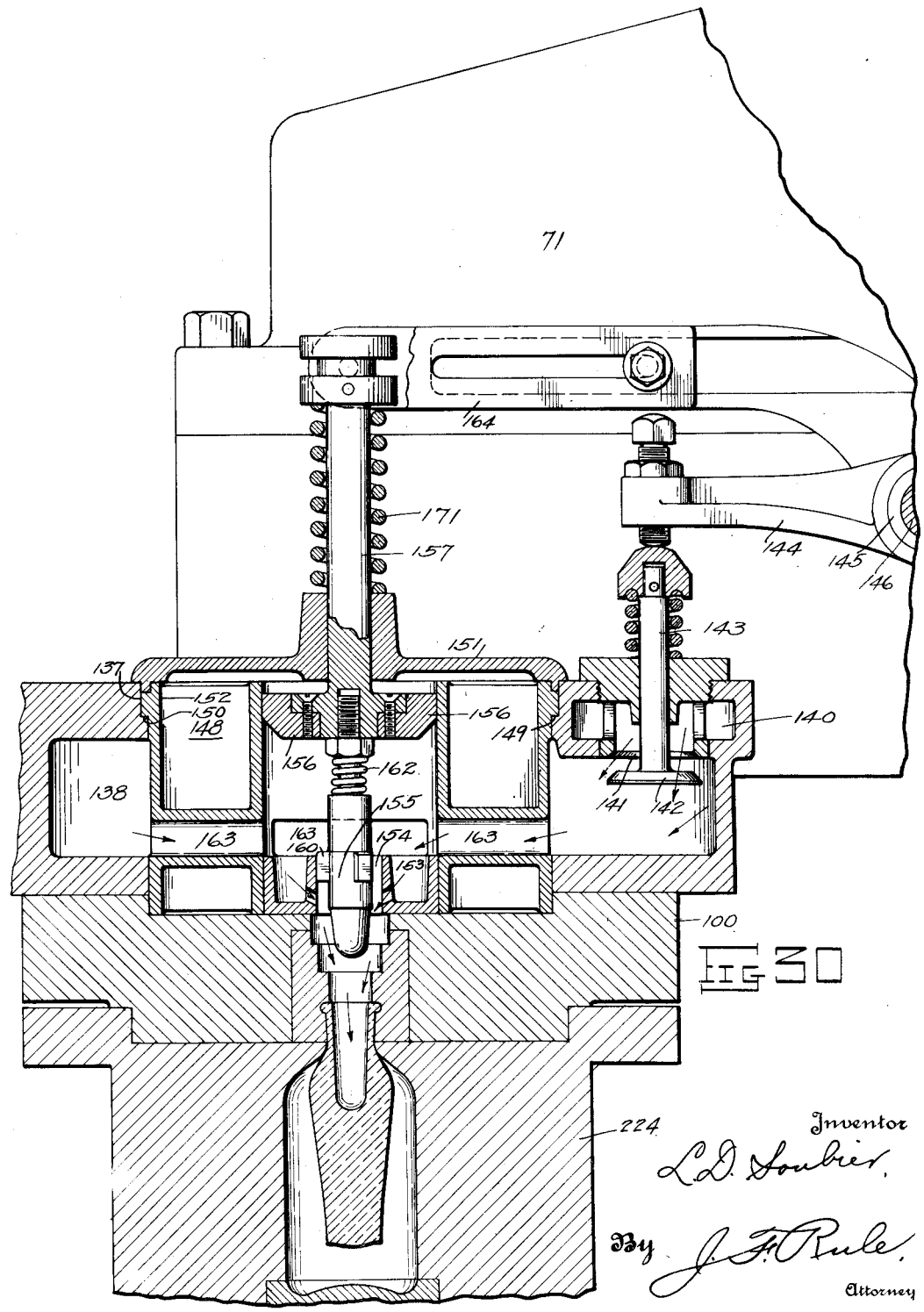

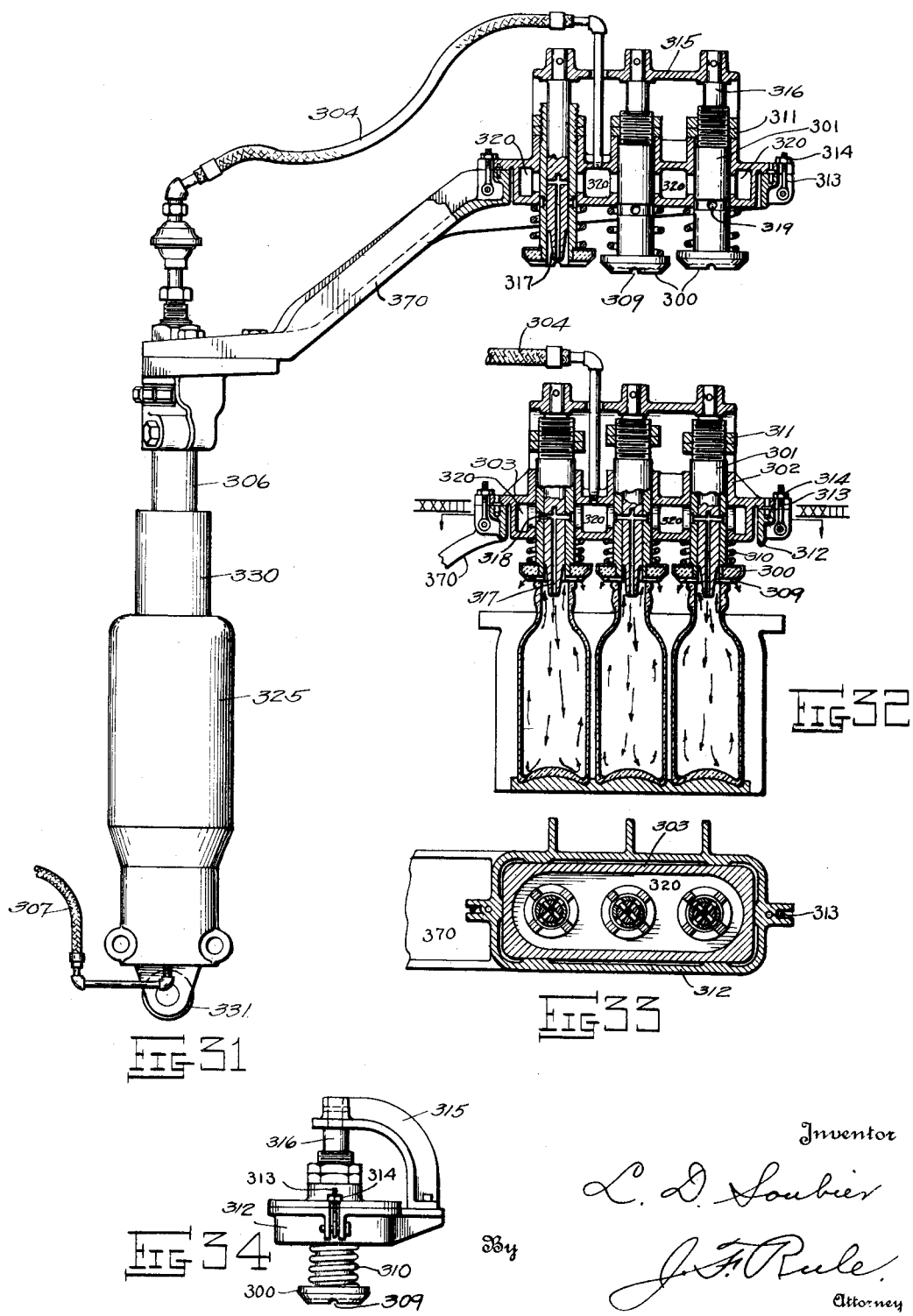

Dec. 2, 1930.  L. D. SOUBIER  1,783,201
GLASSWARE FORMING MACHINE
Filed June 30, 1927   17 Sheets-Sheet 15
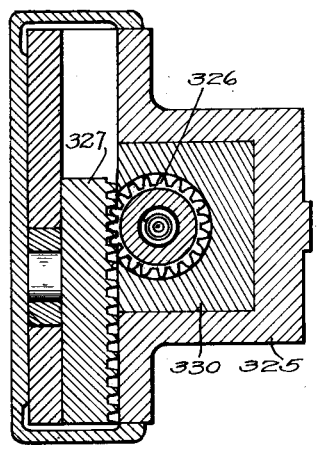
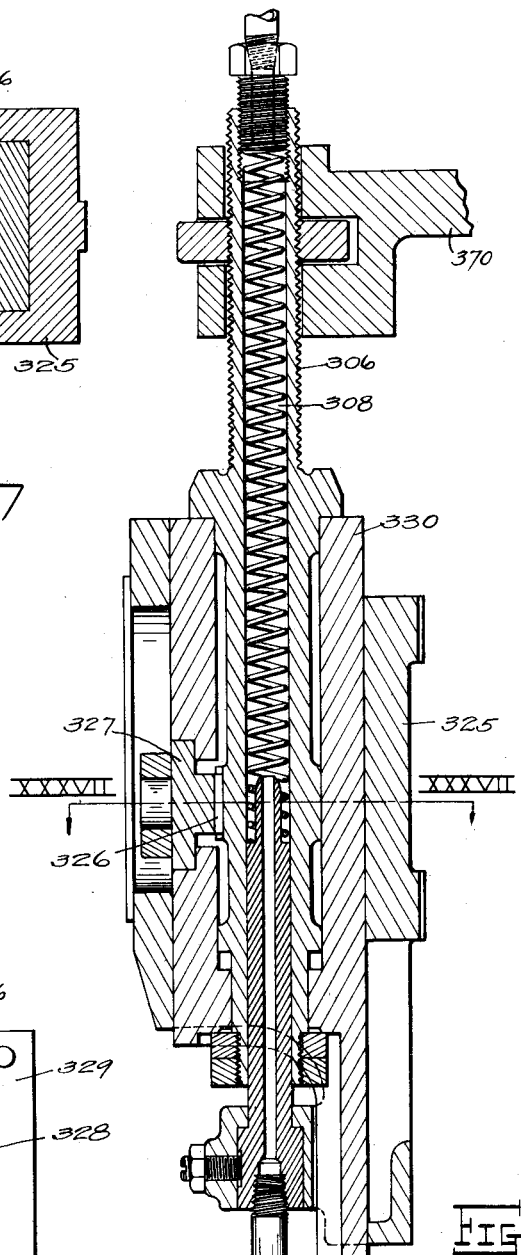
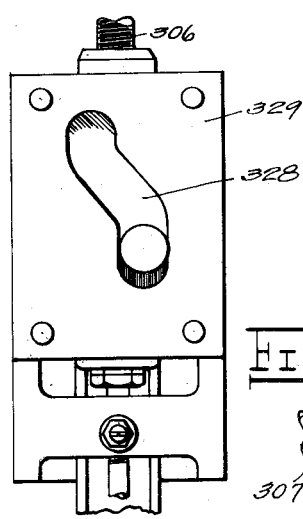
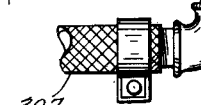

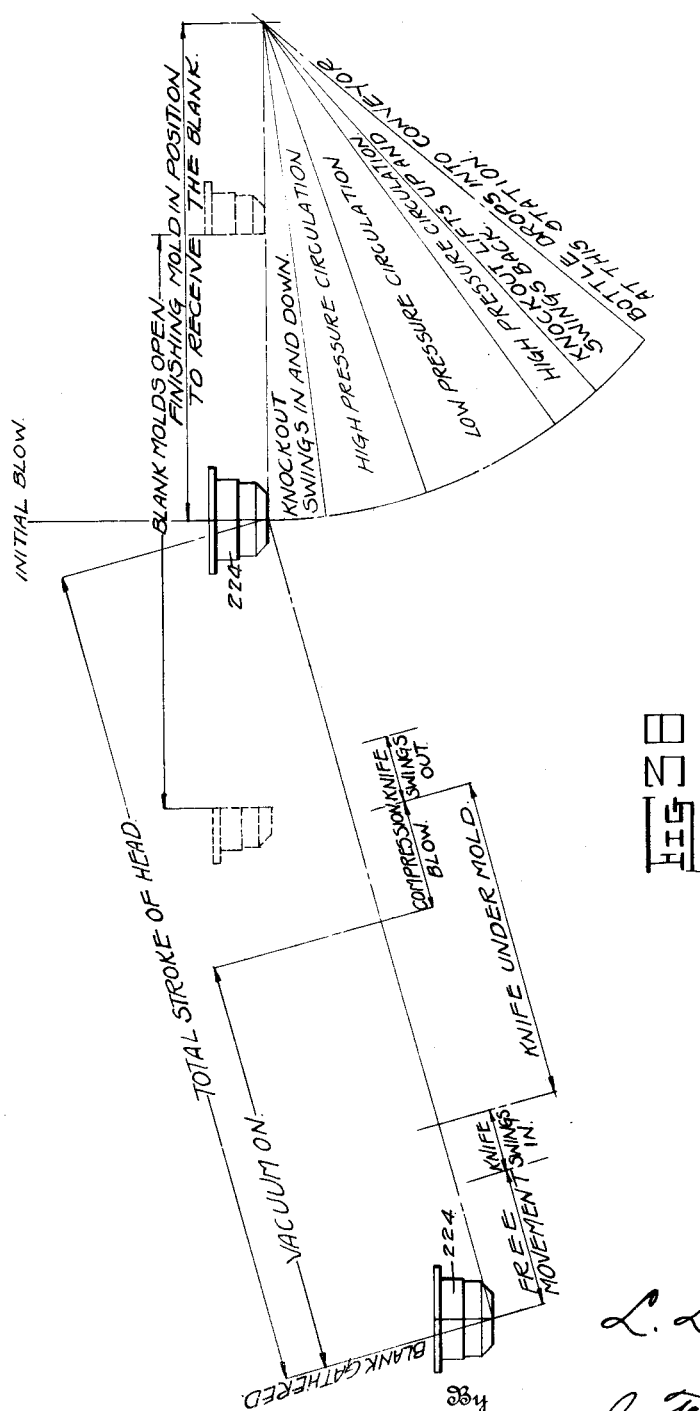

Patented Dec. 2, 1930

1,783,201

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASSWARE-FORMING MACHINE

Application filed June 30, 1927. Serial No. 202,633.

The present invention relates to improvements in glassware forming machines.

An object of the invention is to provide a stationary glassware forming machine comprising a single unit, which incidentally resembles more or less a mold unit or head of a machine of the type including a rotary mold carriage, but embodies features whereby production is materially increased as compared with a rotary machine. In the rotary type machine referred to, the molds move about a vertical axis and perform their functions in certain definite cycles necessitating considerable idle movement on the part of the blank molds. For example, the blank mold must necessarily make complete revolutions about the mold carriage axis in order to periodically reach the charge gathering station, and since the blank transfer station is located at approximately 180 degrees from the charge gathering station, it is evident that the blank mold is idle during approximately one-half of its rotary movement, that is, from the station at which the blank transfer takes place, to the charge gathering station.

Also, in the rotary type machine, the finishing molds and neck molds are held closed about an article or articles for a considerable period of time to insure complete setting of the glass before the finishing mold starts downwardly to the ware ejecting station, there being no treatment of the articles by air pressure or the like during the stated downward movement. It is therefore evident that production is necessarily limited by the above conditions which cannot be avoided in this type of machine.

According to the present invention, it is not necessary for the blank molds to remain inactive during a prolonged period of time, due to the fact that the present machine provides that immediately a parison is transferred to the finish molds, the blank molds are free to and do return to the parison gathering position. Also, there is provided in the present machine, means functioning after the neck molds release the ware, for cooling and thereby setting the glass in the articles while in the finishing mold and during downward movement of the latter to the ware ejecting station. Thus, a major portion of the periods of time heretofore required to bring the blank mold from the blank transfer station to the charge gathering station, and to firmly set the ware prior to lowering of the finishing molds, is utilized to materially increase the rate of production of finished articles.

Another advantage of a machine constructed in accordance with the present invention is that a battery of such machines may be operated with a single furnace, thereby permitting the production of ware of various types and at various rates of speed. Also, where a battery of such machines is employed, the necessity for shutting down several units, because of inoperativeness of one unit, is obviated.

A further object of the present invention is to provide a single unit stationary machine, having exceptional flexibility, permitting production of a wide range of ware and requiring only slight adjustments when the type of ware is to be changed.

It is also an object to provide a machine embodying a finishing mold and mechanism so constructed that cooling air may be freely circulated through the articles in the finishing mold during lowering of the latter to the ware ejecting position. Thus, the necessity for holding the finishing mold in its original final blowing position to firmly set the glass, and incidentally delay return of the blank mold to charge gathering position, is avoided.

Other objects will be apparent hereinafter.

In the accompanying drawings:

Fig. 1 is a side elevation of the machine with parts in section, showing the blank mold in charge gathering position.

Fig. 2 is a fragmentary plan view of one corner of the machine showing the pipe connection between the blank mold carrier and the air pressure chamber.

Fig. 3 is a fragmentary plan view showing the pipe connection between the air pressure chamber, trunnions of the finishing mold, and the knock-out arms.

Fig. 4 is a fragmentary plan view of the machine, showing the parts in blank transfer position, the upper cam being removed from the frame.

Fig. 5 is a fragmentary front elevation of the machine showing the finishing mold lowered to the ware ejecting station.

Fig. 6 is a fragmentary front elevation, partly in section, showing the blank molds in charge gathering position.

Fig. 7 is a detail elevation with parts in section, showing the rock shaft which controls movement of the blow valve lever, plunger lever, and neck mold arms.

Figure 39:
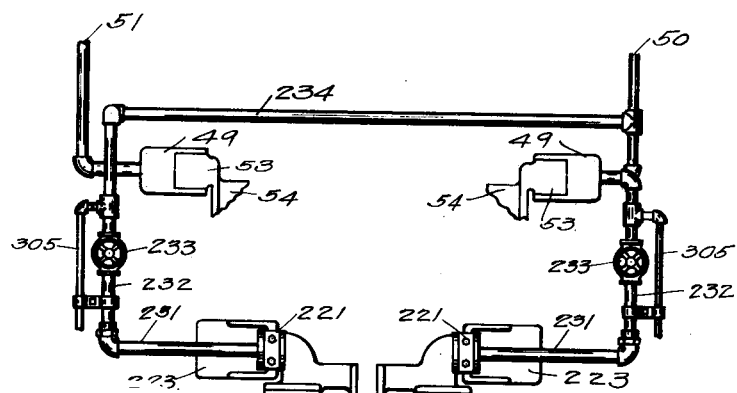

Fig. 7—A is a sectional view along the line VII$^A$—VII$^A$ of Fig. 7.

Fig. 8 is a detail sectional elevation showing the blank mold and its operating devices in the position occupied during the charge gathering period.

Fig. 9 is a detail plan view of the slide which carries a portion of the blank mold opening and closing mechanism, and shows the movable slideways supporting said slide.

Fig. 10 is a fragmentary detail in section showing aligned ports in one of the guide rails and a supporting arm for the blank mold through which air pressure or vacuum is applied to the mold through said rail and arm.

Fig. 11 is a view similar to Fig. 10, showing the ports out of register with each other to shut off communication between the chambers in guide rail and mold arm.

Fig. 12 is a detail elevation with one side frame of the machine removed and parts in section, showing the blank mold and shears with their operating connections in the position occupied during gathering of charges.

Fig. 13 is a view similar to Fig. 12, showing the mold just after a charge has been gathered and the cut-off positioned to close the bottom of the mold.

Fig. 14 is a plan view of the blank mold and associated parts positioned as shown in Fig. 13, said Fig. 14 showing one mold, parts being shown in section.

Fig. 15 is a front elevation of the mold and parts illustrated in Fig. 14.

Fig. 16 is a plan view with parts in section, showing the blank mold in charge gathering position and the mold and cut-off operating devices disposed substantially as shown in Fig. 12.

Fig. 17 is a front elevation with parts in section of that portion of the machine shown in Fig. 16.

Fig. 18 is a vertical sectional view of the support for the cut-off knife, showing the means whereby the knife may be adjusted vertically relative to the mold.

Fig. 19 is a detail plan view with parts broken away to show the neck molds and their opening and closing devices.

Fig. 20 is a fragmentary side elevation in detail of the parts shown in Fig. 19.

Fig. 21 is a detail sectional view of the blank mold and blowing head including the plunger mechanism, the latter being shown in the position occupied during gathering of charges of glass.

Fig. 22 is a view similar to Fig. 21, showing the plungers elevated, permitting application of air pressure to glass in the blank mold.

Fig. 23 is a detail side elevation showing the mechanism controlling application of blowing air to the blanks in the finishing mold.

Fig. 24 is a plan view of the mechanism shown in Fig. 23.

Fig. 25 is a detail sectional view with parts in elevation showing the blank molds open, the finishing molds at the blank transfer station, and the blowing air control valve open.

Fig. 26 is a plan view of one portion of the finishing mold unit, the mold being shown in closed position.

Fig. 27 is a plan view of the other section of the finishing mold unit showing the mold in open position as at the ware ejecting station.

Fig. 28 is a side elevation of the finishing mold unit including the knock-out mechanism.

Fig. 29 is a fragmentary detail, showing the cam which actuates the knock-out mechanism.

Fig. 30 is a detail sectional view showing the finishing mold and blowing head in position to blow a blank to its final form, this view also showing the air pressure control valve which is arranged between the molds.

Fig. 31 is a detail elevation with parts in section, showing the knock-out mechanism which is formed to permit application of air pressure and cooling air to the articles in the finishing mold.

Fig. 32 is a detail sectional view showing the knock-out disks seated upon articles in the finishing mold.

Fig. 33 is a sectional view taken substantially on the line XXXIII—XXXIII of Fig. 32.

Fig. 34 is a detail elevation of one of the knock-out disks and its support.

Fig. 35 is a vertical sectional view of the knock-out arm support showing the air pressure conduit therethrough.

Fig. 36 is a fragmentary elevation showing the means for rocking the knock-out arm.

Fig. 37 is a transverse sectional view taken substantially along the line XXXVII—XXXVII of Fig. 35.

Fig. 38 is a diagram illustrating the steps taken by the blank mold and blank from the gathering station to the station at which the blank is ejected in the form of a finished article.

Fig. 39 is a fragmentary plan view showing the air pressure system for applying blowing air to blanks in the finishing mold.

Figure 40:
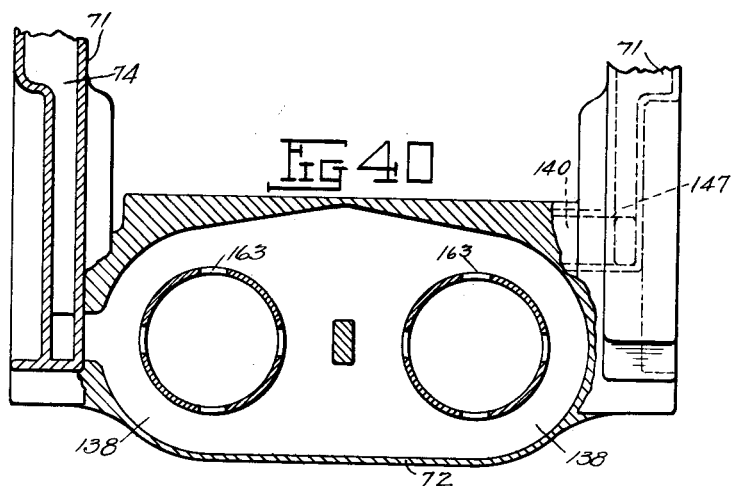

Fig. 40 is a sectional elevation showing the passageways for vacuum and air pressure to the molds.

Figure 41:
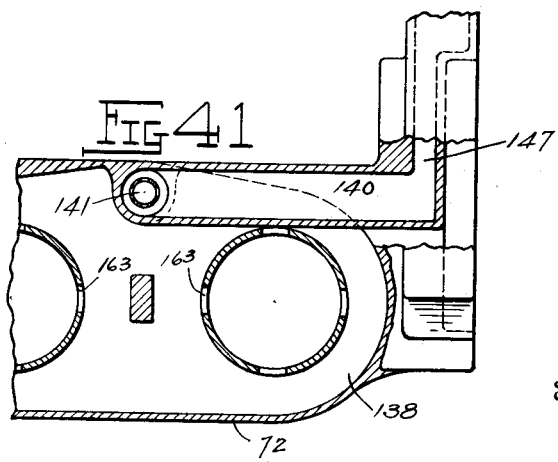

Fig. 41 is a view similar to Fig. 40, but details the air pressure channels to the molds.

Referring to the drawings, the machine comprises a base 45 mounted on wheels 46, which, in turn, are supported upon spaced rails 47. This base 45 supports the mold carriage and power unit. By providing a wheeled base to support these units, the entire structure may readily be moved relative to the furnace extension permitting ready access to said extension and the molds.

The blank mold and finish mold units are arranged in superposed relation at one end of the base 45, said mold units being carried by separate frames or carriages which are vertically adjustable relative to each other permitting utilization of the machine in the production of ware of varying sizes and shapes as will be hereinafter apparent.

The finishing mold carriage or frame is arranged beneath the blank mold and includes a pair of vertical side members 48 (Figs. 1, 4 and 5) spaced transversely of the base and bolted or otherwise rigidly fixed to the latter. At the inner end of each side member 48, a vertically extending arm 49 is formed. These arms 49 (Fig. 4) are of hollow formation providing vertically elongated chambers, one of which is connected near its lower end to a source of air pressure supply (not shown) by means of a pipe 50. The other chamber formed in the arm 49 at the opposite side of the machine (Fig. 1) is connected at its lower end to a vacuum pipe 51 (Figs. 4 and 39) for a purpose hereinafter apparent. The adjacent inner faces of these upwardly extending arms 49 are provided with inwardly opening vertical channels or guideways 52 (Figs. 2 and 4) in which ribs 53 on a blank mold carriage 54 are arranged.

This blank mold carriage 54 (see Figs. 4 and 5) comprises a pair of transversely spaced vertical side members 55 whose extreme upper ends are directed inwardly and upwardly and then interconnected by a crossbar 56. These inwardly directed ends support blank mold guide rails 70 (Figs. 5 and 8) as hereafter described. The side members 55 of the blank mold frame each carry pairs of depending studs 57 (Figs. 1 and 5) near their opposite ends, said studs extending downwardly and slidably received in guides 58 formed on the finishing mold frame members 48. Portions of these studs are threaded and carry adjustable stops 59 which determine the extent of downward movement of the blank mold frame relative to the finishing mold carriage, and in part control the dip of the blank mold into the supply body of molten glass.

An adjusting screw 104 (Fig. 1) is arranged at each side of the machine between said studs 57 and has threaded engagement with a boss 60 on the finishing mold carriage. This adjusting screw is mounted in a suitable bearing 61 on the blank mold frame and is operatively connected to the lower end of a control rod 62. These rods 62, one of which is journalled in vertically spaced bearings 61ª at each side of the blank mold frame, carry bevel gears 63 at their upper ends running in mesh with bevel gears 64 pinned to a transverse shaft 65 journalled in bearings at the upper end of the blank mold frame. One end of this transverse shaft extends outwardly beyond one of the bevel gears 64 and carries a hand wheel 66 providing means whereby said rods may be manually rotated to effect relative vertical adjustment between the blank mold and finishing mold frames. Thus, molds of different sizes may be mounted upon the mold carriers, permitting use of the machine for producing various types of ware.

The blank mold carriage is provided with a pair of opposed forwardly declined guide rails 70 (Fig. 8) which slidably support mold carrying arms 71, the forward ends of the latter being interconnected by a transverse member 72 from the lower side of which the blank and neck molds, together with the blowing heads, are suspended. In order that air pressure and vacuum may be applied to glass in the molds at proper time intervals, the guide rails 70 and the mold arms 71 are of hollow formation providing longitudinal chambers 73 and 74, respectively (Figs. 10 and 11), said chambers having communication with each other at times by way of ports 75 and 76 in said guide rails and mold carrying arms. According to the present disclosure, the blank mold guide rail 70 on the far side in Fig. 1 is connected to the vacuum chamber in the corresponding vertical arm 49, while the guide rail on the other, or near side of the machine, is connected to the air pressure chamber in the hollow arm 49, shown in Figs. 1 and 39 as being connected to an air pressure supply pipe 50. Connection between the inner upper ends of the blank mold guide rails 70 and the air pressure and vacuum chambers in the vertical arms 49, is effected by pipe lines 67 (Fig. 1), each of which includes a vertical branch made up of two telescoping pipe sections 68 permitting vertical adjustment between the blank mold and finishing mold carriages without interfering with the air pressure and vacuum line connections between said chambers and the guide rails. The pairs of ports 75 and 76 in the two pairs of guide rails and mold supporting arms are spaced apart longitudinally so that while the blank molds are in one position, vacuum is applied, and while in a succeeding position, vacuum is cut off and air pressure is applied to the molds, it being understood that a vacuum chamber is formed in one arm and an air pressure chamber in the other.

Reciprocation of the blank molds between the charge gathering station and the blank transfer station (Fig. 38), is effected by means of a rack and pinion mechanism which includes rack bars 75 on the upper sides of the blank mold carrying arms 71 (Figs. 5 and 8), the teeth of the rack bars running in mesh with a pinion 76 carried by a shaft 77 journalled in bearings on brackets 78. Each of these shafts 77 also carries a small pinion 79 running in mesh with a rack bar 80 (Figs. 6 and 8) fixed to the lower faces of inter-connected slides 81 running in horizontal guideways 82. A cross bar 83 (Figs. 6 and 8) interconnecting the two slides 81, carries a cam roll 84 on its upper side running in a cam trackway 85 on a continuously rotating cam table 86. This cam table 86 is keyed to the upper end of a shaft 87 journalled in a bearing 88 between the side members of the blank mold carriage, and carrying a bevel gear 88<sup>a</sup> at its lower end immediately beneath said bearing. This bevel gear 88 runs in mesh with a bevel gear 89 keyed to a transverse shaft 90 (Figs. 5 and 6), journalled in bearings 91 on the blank mold frame. This transverse shaft is continuously rotated by means of an extensible vertical shaft 93 (Fig. 1) to which it is operatively connected by intermeshing bevel gears 94. The lower end of the extensible shaft 93 has a bevel gear drive connection with a horizontal shaft 95 which in turn is operatively connected to a motor driven shaft 96 by means of intermeshing bevel gears 97. Between this motor driven shaft 96 and the motor 98, is interposed a speed reduction gearing 99 which, together with a motor control rheostat (not shown) permits operation of the cam 86 at various speeds to determine the rate at which charges are gathered into the blank mold and formed into blanks for transfer to a finishing mold. Obviously, and as will be brought out hereinafter, this motor speed determines not only the rate at which charges are gathered, but governs the rate of ware production in general.

A pair of neck molds is arranged upon the under side of the transverse member 72 interconnecting the blank mold arms 71, each mold comprising a pair of cooperating sections 100 pivoted to a common hinge pin 101 (Figs. 6 and 19). These neck mold sections are connected by toggle links 102 to the lower end of a lever 103 freely journalled near its upper end on a transverse rock shaft 146 (Figs. 7, 19 and 20). The upper end of each lever 103 is formed with an opening 105 through which a guide rod 106 extends, said rod having one end fixed to a bracket 107 extending inwardly from the mold carrying arm 71. A coil expansion spring 108 encircles said rod between the bracket 107 and the upper end of the lever 103 and serves to normally and yieldably hold the lever in a position to close the neck mold. The neck molds are opened at the blank transfer station after the suspended parisons have been enclosed by the finishing mold. Such opening of the neck molds is effected by a push rod 109 (Figs. 20 and 25), slidably mounted in a bearing 110 on one of the arms 71 and in a bearing 125 formed in one of a pair of arms 127 rigidly connected to the blank mold arms 71 by a spacer or hanger 126. One end of this rod 109 periodically engages a finger 111 keyed to a transverse shaft 112 arranged adjacent the forward end of the blank mold supporting arms (Figs. 19 and 20), said shaft 112 also mounting a pair of longitudinally spaced fingers 113 engageable with an upper end portion 114 of each neck mold operating lever 103 (Fig. 20). The other end of the push rod 109 carries a cam roll 115 which periodically strikes a cam 116 mounted on and rotating continuously with the transverse drive shaft 90 (Figs. 6 and 8). Thus, it is seen that when the blank and neck molds are in the retracted or blank transfer position (Fig. 25), the cam 116 will, at a predetermined station, strike the cam roll on the inner end of the push rod 109 causing forward movement of the latter to actuate said fingers and links to open the neck molds 100.

The blank molds 117 associated with the neck molds 100 each comprise a pair of cooperating sections supported in suitable holders or carriers 118 of standard well known construction, one holder being directly connected to a slide 119 having a rack bar 120 on its upper side. The other holder is fixed to a slide 121 carrying a rack bar 122 on its lower face. These rack bars run in mesh with a pinion 123 (Fig. 8) keyed to a transverse shaft 124 whose ends are journalled in transversely aligned stationary bearing blocks 370.

A spacer 126 which interconnects the mold carrying arms 71 (Figs. 4, 5 and 8) supports a pair of transversely spaced rearwardly inclined guideways 127 in which a slide 128 is mounted. This slide (Figs. 8 and 9) carries a pair of upstanding bosses 129 in which one end of a pair of guide rods 130 is fixed, the other ends of said rods being slidable through openings formed in said spacer. Coil springs 131 encircle the guide rods 130 and are confined between the bosses 129 and the spacer 126, said springs serving to yieldably hold the spacer and slide spaced apart to the maximum degree. At one end of the slide 128, an upstanding boss 132 is formed and has pivotal slidable connection to a yieldable connector 133 whose other end is pivoted to one of the mold operating slides 121. This connector functions as a cushioning device for the mold opening and closing devices. A depending finger 134 integrally formed with the forward end of the slide 128 is adapted to engage an adjustable stop 135 (Figs. 8 and 25) during movement of the molds to the blank transfer station. This adjustable stop comprises a screw threaded through a holder 136 suitably mounted upon the blank mold frame. At a predetermined point in advance of the blank transfer station, inter-engagement between the depending finger 134 on the slide 128 and stop 135 is effected, whereby further upward and outward movement of the slide with the mold supporting arms is prevented. The yieldable connections formed by the coil springs (Figs. 8 and 9) allow the molds and their supporting arms to continue movement toward the blank transfer station independently of the slide 128 and the slide 121 supporting the rack bar which runs in mesh with the upper side of the pinion 124 (Fig. 8), said slides being held stationary while the molds move to the blank transfer station. Thus, there is effected a relative movement between the two rack bars 120 and 122 by which the blank mold sections are separated just prior to arrival at the blank transfer station (Fig. 25). During the retractive movement of the blank molds to the blank transfer station, the glass charges gathered into the molds are compacted and transformed into parisons so that they are in condition for transfer to the finishing mold immediately upon arrival at said blank transfer station.

The transverse member 72 interconnecting the mold carrying arms 71 and supporting the blank and neck molds is formed with a pair of circular openings 137, the walls of which are formed with inter-communicating annular channels 138. The annular channel 138 at the left of Figs. 6 and 40 communicates directly with the vacuum chamber 74 formed in the mold supporting arm 71. A chamber 140 is formed along the inner side of the mold supporting member 72 (Figs. 30 and 41) and communicates with the transverse connecting passageway 139 by way of a valved opening 141. The air pressure control valve comprises a disk 142 carried by a stem 143 extending upwardly through said chamber 140 and actuated at intervals by a rock arm 144 to shut off communication between said chamber 140 and the passageway 139 at predetermined time intervals. This rock arm 144 is mounted upon a tube 145 surrounding the rock shaft 146 (Figs. 6 and 7). The chamber 140 communicates with the air pressure chamber formed in the mold supporting arm 71 at the right of Fig. 6 by way of a passageway 147 (Figs. 6 and 41). Thus, at a predetermined time interval following shutting off of the vacuum, the valve disk 142 is lowered permitting supply of air pressure to the channels 138.

A blow head 148 (Figs. 6, 21, 22 and 30) is removably seated in each opening 137 in the mold arm connector 72, said head being of circular formation and formed with a shoulder 149 which rests upon an annular seat 150 formed on the wall of the opening. A cap 151 (Figs. 16, 21 and 22) serves to releasably hold each blowing head on its seat. The blowing head cylinder 152 is provided with a bottom plate 153 formed with a series of openings 154, each of which is adapted for vertical alignment with the axis of a neck mold cavity, permitting reciprocation of the plungers 155 into and out of positions in the neck mold in which they form the initial blow openings in the parisons. These plungers (Figs. 21 and 22) have yieldable connection to a plunger holder or head 156 which is arranged within the blowing head cylinder and fixed to the lower end of a reciprocable operating rod 157. The connection between the head 156 and each plunger includes a depending stem 158 having one end threaded into said head, while its other end has a pin and slot connection 159 with the plunger proper, the latter being provided with an annular series of radial ribs 160. These ribs, when the plunger is in its lowermost position, engage stops 161 formed on the walls of the neck mold cavity to thereby limit downward movement of the plunger. The ribs also serve to center the plungers in the openings 154 and provide longitudinal passageways through which air pressure and vacuum are alternately applied to the glass in the blank mold. A coil spring 162 surrounding each stem 158 functions as a cushioning device preventing straining or breaking of parts in the event of excessive downward pressure on the part of the plunger carrying head 156. The lower corner of the head 156 is beveled, permitting application of air pressure and vacuum to the blank mold cavities through radial openings 163 spaced circumferentially of the blowing head cylinder (Figs. 21 and 40). These radial openings 163 provide communication between the annular channels 138 and the interior of the blowing heads. The upper end of the plunger operating rod 157 is connected to the outer end of an extensible rock arm 164 (Fig. 25), whose other end is connected to the rock shaft 146 so that rocking of said shaft causes reciprocation of the plunger carrying heads between their two operating positions. The connection between the plunger operating lever 164 and the rock shaft 146 (Figs. 7 and 7—A) includes an arcuate circumferential slot formed in the sleeve or tube 145 permitting oscillative movement of the key 165 in said slot when the arm is being rocked. Thus it is seen that the shaft 146 and sleeve 145 may be rocked independently of each other. Rocking of the shaft 146 is effected by a cam lever 166 which is keyed to one end of said shaft (Figs. 6 and 7) and carries a cam roll 167 running on a stationary cam track 168 (Figs. 12 and 13). While this cam roll 167 rides upon the cam track 168, the cam lever 166 and plunger control rods 157 are so positioned that the plungers 155 are projected into the upper ends of the blank molds to form initial blow openings in the blanks. Simultaneously with such positioning of these elements, the ports in the chambers 73 and 74 (Fig. 10), formed in the blank carrying arm and guide rail 71 and 70, respectively, at the left of Fig. 6, are aligned with each other permitting application of vacuum to the blank and neck mold cavities so that molten glass is gathered into said cavities from the supply body of molten glass in the furnace extension 350. Simultaneously with this charge gathering operation, the initial blow opening is formed in the neck end by the plunger 155 as is customary in machine production of ware.

At a point spaced inwardly beyond the inner end of the vacuum control cam but formed on the other guide rail 70, a relatively short stationary cam 169 is formed to engage the other cam roll lever 170, which is keyed to the sleeve or tube 145 at the end opposite the other cam roll lever 166 (Fig. 7). Upward rocking of this lever 170 by action of the cam 169, and downward rocking of the other lever 166, permits lifting of the plungers 155 away from the glass under influence of a coil spring 171 surrounding the operating rod 157, and positions the mold and blowing head elements so that a short puff of air pressure may be applied through the openings 154 to the glass forming the blanks. Simultaneously with lifting of these plungers and due to rocking of the sleeve 145, the valve disk 142 (Fig. 30) is lowered permitting introduction of air pressure into the annular passageway 138 and thence through the vertical openings 154 (Fig. 21) into compacting engagement with the glass. This compacting blow takes place, of course, after a cut-off knife 182 has been positioned over the entrance to the mold cavity. It is noted in Fig. 7 that the rock arm 144 which periodically operates the air pressure control valve 142 is keyed to the sleeve 145 and is operated simultaneously with lifting of the plungers due to movement of the cam lever 170 (Figs. 7 and 12). This application of air pressure to compact the glass is permitted by alignment of ports formed in the chambers provided in the mold carrying arms 71 and guide rails 70 shown at the right of Fig. 6, such ports being brought into alignment with each other at a station adjacent the inner end of the vacuum cam 168 (Fig. 12) and following dis-alignment of the ports in the vacuum chambers in the other arm and guide rail.

The cam tracks 168 and 169 (Fig. 12) are carried by separate frames 172, one arranged at each side of the blank mold carriage and having a bolt and slot connection with said carriage and swivel connection at its upper inner end to an adjusting screw 173 threaded through a bearing 174. This bearing is also fixed to the blank mold carriage. By adjusting the screw 173, the cams and frame 172 are moved longitudinally as a unit, changing the timed relation between lifting of the plungers in the mold and application of air pressure to the blank mold cavities. The air pressure cam 169 is slidable longitudinally of its frame 172 independently of the plunger control cam 168 (Fig. 12). This cam is seated in a longitudinal way formed in the frame 172 and is threaded to one end of an adjusting screw 175 which is rotatable to cause movement of the cam 169 along its guideway. Such adjustment of this air pressure control cam, changes the time interval between the application of air pressure and lifting of the plungers.

A cut-off mechanism is provided for the blank molds and includes bearings 180 spaced outwardly from opposite sides of the blank molds, each mounting a vertical spindle 181 carrying at its lower end a cut-off knife 182. The upper end of each spindle 181 is threaded through an adjusting hand wheel 183 which bears against a sleeve 184, said sleeve being splined to the spindle within said bearing 180 and carrying a pinion 185 running in mesh with a rack bar 186 (Figs. 17 and 18) Rotation of the hand wheel 183 vertically adjusts the cut-off knife 182 whereby accurate positioning of the knife for cooperation with the blank mold is readily obtained. The sleeve 184 is formed with a circumferential groove 187 which receives rollers 188 carried by a fork 189 on the end of a lever 190, the latter being fulcrumed between its ends to a pivot pin 191 formed at the upper end of a bracket 192 which supports the bearing 180. The other end of this lever 190 carries a cam roll 193 running in a cam trackway 194 (Fig. 12). This cam trackway 194 extends parallel with the line of travel of the mold carrying arms and is formed with an offset 195 which operates to rock the lever 190, causing downward movement of the knife carrying spindle 181 through its bearing. This movement positions the knife so that it may be swung laterally to cut off the chilled stringy portions of glass from the charge and close the bottom of the mold cavity. From this offset 195 to a point adjacent the opposite end of the cam trackway 194, said cam trackway extends parallel with the front end portion of the trackway and is provided with another offset 196 which operates to lower the cut-off knife 182 away from the mold just prior to swinging said knife laterally.

Actuation of the cut-off knives 182, one of which is arranged at each side of the machine, is effected by movement of the rack bar 186 (Figs. 12, 13 and 14), the latter being fixed to one end of a push rod 200 slidably mounted in a pair of spaced bearings 201 which are formed at the upper ends of brackets 202 on the blank mold carriage. A coil spring 203 encircles said push rod between its bearings, the tension of said spring being variable by adjustment of a nut 204 threaded on said rod (Fig. 12). This spring serves to normally and yieldably hold the rack bar in its innermost position so that the cut-off knife will normally be located at one side of the blank mold. This push rod is provided with a cam roll 205 at the end opposite the rack bar 186. The cam roll 205 engages a stop 211 at the entrance to the cam trackway 206 formed in a frame 207 just after the charges of glass have been gathered into the mold and the mold lifted slightly away from the supply body of glass. The frame 207 is pivoted at one end to a pin 208 on the blank mold carriage and normally occupies a position substantially in parallelism with the blank mold carrying arms 70. The free end of this frame 207 rests upon an adjustable stop 209 and is yieldably held thereon by a coil spring 210 (Fig. 12). The stop 211 at the entrance of this cam trackway 206 is positioned so that it engages the cam roll 205 during the retractive movement of the blank molds and holds the cam until the molds have moved vertically a sufficient distance to allow the cam roll 205 to move above said stop and enter the main portion of the cam trackway. This engagement between the stop 211 and the cam roll 205 causes relative movement between the rack bar 186 and spindle 181 so that the cut-off knife 182 is rotated and thereby positioned beneath the blank mold. During this operation, the coil spring 203 surrounding the push rod 200 (Fig. 12) is compressed and is retained compressed until just prior to opening of the blank mold. As the cam roll 205 approaches the upper end of the cam trackway 206, it enters a horizontally disposed portion 212 permitting expansion of the coil spring 203, sliding of the rack bar 186, and return of the knife 182 to its normal position at one side of the blank mold. The degree of movement of this cam roll 205 is such that it swings the latch 213 upwardly and moves a distance beyond said latch permitting the latter to swing back to its normal position (Figs. 12 and 13) to close the end of the trackway. Accordingly, when the blank mold starts its return movement to the gathering area in the furnace extension, said roll engages the inclined outer face of the latch 213 and causes the frame 207 to swing upwardly substantially as indicated in dotted lines in Fig. 12. Thus, the molds return to the charge gathering position without interference on the part of the cut-off actuating mechanism.

In the formation of a blank or parison, the blank mold is moved forwardly and dips into the supply body of molten glass due to rotation of the cam 86 (Figs. 1 and 8) which actuates the rack bars 80, causing rotation of the pinions 76 and 79, the former running in mesh with the rack bars 75. This forward movement of the mold carrying arms on the guide rails 70, aligns ports in the vacuum chambers formed in the guide rail and mold carrying arm at the left side of Figs. 5 and 6 so that vacuum is applied to the cavities in the neck and blank molds to gather charges of molten glass from the supply body. Immediately following this gathering operation and while the application of vacuum is continued, the mold begins its retractive movement (Figs. 13 and 38) due to reversing the rack and pinion movement. At a predetermined point (Fig. 13), the cut-off knife 182 is lowered and swung inwardly to cut off the chilled portions of glass and close the lower end of the mold cavity. These movements of the cut-off knife are effected by the offset 195 in the cam trackway 194 and the stop 211 at the entrance to the cam trackway 206 (Fig. 12). Application of vacuum continues for a period of time after the cut-off knife is positioned over the mold cavities, and at a predetermined station is discontinued and in its place a relatively short puff of air pressure is applied to the glass in the mold. This application of air pressure takes place just following lifting of the plungers away from the glass substantially as shown in Fig. 22, vacuum having been applied while the plunger was in its lowermost position (Fig. 21). When the blank mold has reached a predetermined point in its retractive movement, the finger 134 (Figs. 8 and 25) on the slide 128, strikes the stop 135 causing relative movement between the rack bars 120 and 122. These rack bars are rigidly and directly connected to the blank molds holders and due to the relative movement between the rack bars, the blank mold sections will be gradually opened as the mold approaches the blank transfer station. When the blank molds reach the blank transfer station (Fig. 25), they are completely open permitting the finishing molds to enclose the blanks preparatory to blowing them to their final form. This final blow at the transfer station is effected by a mechanism shown in Figs. 23 and 24 and described in detail hereinafter.

Immediately following enclosure of the blanks in the finishing mold and the final blow, the cam roll 115 at the end of the push rod associated with the neck mold actuating mechanism is engaged by the continuously rotating cam 116 (Figs. 6 and 8). Such engagement actuates the neck mold operating devices and opens the neck molds as shown in Fig. 19, and more fully described in Patent No. 1,641,497, granted September 6, 1927, to Richard La France.

During the initial portion of the return of the blank mold to the charge gathering station, the mold sections are held apart due to engagement between the finger 134 and the stop 135 (Fig. 25). At a predetermined point, the finger and stop separate and the mold sections are brought together by action of the springs 131 on the slide 128.

The finishing mold unit comprises a frame 220 formed with a pair of opposed transversely aligned trunnions 221 journalled in bearings 222 formed on arms 223 which are bolted or otherwise rigidly fixed to the side members 48 of the finishing mold carriage (Figs. 5 and 25). According to the present disclosure, the finishing mold unit includes a pair of plural molds 224 each comprising a pair of mold sections 225 fulcrumed to an upstanding pivot pin 226 (Figs. 27 and 28). The mold sections 225 are connected through links 227 to arms 228 and 229 pivoted to a hinge pin 230. These arms 228 and 229 may be of hollow formation and communicate with a source of low pressure air supply through the trunnions 221 and pipe line 231 (Figs. 5 and 39). The construction by which supply of cooling air to and through the arms 228 and 229 is made possible is disclosed in detail in the La France Patent Number 1,641,497 hereinbefore mentioned.

The air conduits 231 (Figs. 5 and 39) are directly connected to the supply pipe 232 and include manually operable valves 233 by which pressure of the air may be regulated. As shown in Fig. 39, one of the branch pipes 231 extends rearwardly of the chambered columns 49 and is connected to a transverse pipe 234 which leads to the main supply pipe 50. Thus, cooling air may be continuously supplied to the hollow arms 228 and 229 and to the blank mold carrying nozzles 235 on the finishing mold frame in the manner fully disclosed in the La France patent above referred to.

These nozzles communicate with chambers (not shown) in the trunnions 221 and the finishing mold frame 220, said nozzles being disposed in an upright position during transfer of the blanks or parisons to the finishing mold to thereby direct blasts of cooling air upon the walls of the blank mold cavities while the blank mold sections are spaced apart. Upon completion of the transfer of the blanks to the finishing mold and just before the blank molds begin to close, the nozzles at the forward end of the finishing mold are lowered as shown in Fig. 25. The links 227 which interconnect the mold sections 225 and the arms 229 (Figs. 26 and 27) are yieldable, forming cushioning devices preventing breaking or straining of the finishing mold mountings in the event of excessive pressure on the part of the arms 228 and 229. These arms are interconnected adjacent the pivot pin 230 by a series of levers 236 between one of which and the arm 228 is interposed a yieldable link 237 comprising telescoping sections having pin and slot connection with each other and including a coil spring 238 by which said link is normally yieldably held in its extended position.

The arms 229 are connected by links 239 to a slide block 240 having connection to a slide 241 through links 242 (Fig. 5). This slide block 240 is connected by a link 243 (Figs. 5 and 25) to the upper end of an operating lever 244 fulcrumed between its ends to a transverse rod 245. The lower end of this lever 244 carries a cam roll 246 running in a cam track 247 (Fig. 1) formed on a continuously rotating table 248 fixed to the upper end of a drum 249 resting upon a base 250. This drum 249 is formed with an internal annular gear 251 which runs in mesh with one of the reduction gears which is driven directly by the motor 98 (Fig. 1). Thus, it is seen that rocking of the lever 244 causes movement of the series of interconnected slides and slide blocks to alternately open and close the finishing molds.

Lifting and lowering of the finishing mold frame is effected by the rack and pinion mechanism shown in Figs. 1 and 5. A depending stud 255 is connected by a link 256 to the upper end of a lever 257 which is fulcrumed at its lower end upon a transverse rod 258 whose ends are journalled in bearings 259 (Fig. 5). These bearings 259 are suspended from inwardly directed brackets 260 mounted on the finishing mold carriage 48, these brackets also supporting a pair of opposed guideways 261 extending longitudinally of the finishing mold carriage. A slide 262 is arranged in the guideways 261 and is formed with a central longitudinal slot 263 through which said lever 257 extends. A pair of rack bars 264 are mounted upon the upper side of the slide 262 and run in mesh with a pair of gear segments 265. These gear segments carry stub shafts journalled in bearings 266 formed on brackets 267 which are rigidly mounted upon the inwardly directed arms 260 (Fig. 5). The shafts mounting these gear segments 265 are interconnected by a yoke 268 which carries a slide block 269 (Fig. 1) mounted in a slideway 270 extending longitudinally of the lever 257. A cam roll 271 (Fig. 1) is mounted upon the upper side of the slide 262 and runs in a circular cam trackway 272 formed on the under side of the table 248 which is continuously rotated by the motor 98 in a manner previously set forth. Thus, it is seen that continuous rotation of the cam table 248 and the cam track 272 causes reciprocation of the slide 262 which in turn transmits a rotary movement to the gear segments 265 causing rocking of the lever 257. This movement on the part of the lever 257 raises and lowers the finishing mold unit at proper intervals.

The parisons are suspended bare from the neck mold 100 at the blank transfer station and while so suspended are enclosed in the finishing molds due to inward movement of the arms 228 and 229 with the mold sections 225 (Figs. 26 and 27), such movement being effected by the series of interconnected slides which are moved by the lever 244, said lever being rocked about its fulcrum by the continuously rotating cam 247. Just prior to reaching the blank transfer station, the air pressure cam lever 170 (Figs. 7, 23 and 24) engages the upper face of a finger 275 pivoted to a shaft 276 journalled in a bearing formed on a depending bracket 277 which is fixed to the blank mold frame 54. A finger 278 extending to the opposite side of said shaft 276 is connected by an adjustable rod 279 to one arm 280 fixed to one end of a sleeve 281 which carries at its other end an arm 282 (Figs. 23 and 24). This last named arm 282 is connected by a rod 283 to a rock arm 284 fixed to one end of a transverse shaft 285 journalled in bearings 286 on the upper side of the blank mold frame. A coil spring 287 (Fig. 23) is connected at one end to a blank mold frame and at its other end to an ear 288 fixed to a sleeve rigidly connected to said rock arm 284. An adjustable stop 289 (Figs. 23 and 24) limits the extent of movement of the rock arm under influence of the coil spring 287. This coil spring yieldably holds the rock arms and levers in such position that the air pressure control valve 141 which is actuated by movement of the cam lever 170, is normally held in closed position. A rock arm 290 is fixed to the transverse shaft 285 (Figs. 23, 24 and 25) and carries at its upper end a cam roll 294 engaging a continuously rotating cam track 291 formed on the periphery of the upper cam table 86. An offset 293 formed on the cam 291 periodically engages the cam roll 294 causing rocking of the rock arms 290 and 284 and transmitting such movement through the rods and arms connected to said rock arms that the air pressure control valve 141 (Fig. 30) is opened to admit air pressure into the blowing heads and thence through the neck molds for introduction into the finishing mold cavities for the purpose of blowing the blanks to their final form. This operation expands the blanks to the precise shape of the cavities in the finishing mold.

Following this blowing of the blanks to their final form at the transfer station, the neck molds are opened due to engagement of the cam roll 115 with the continuously rotating cam 116 (Fig. 8). As previously stated, such engagement between these elements actuates the neck mold control devices shown in Figs. 19 and 20, causing the neck molds to open so that the finishing mold unit may swing downwardly with the blown blank toward the ware ejecting station. Following opening of the neck molds and simultaneously with initial lowering of the finishing mold, knock-out arms embodying ware cooling means are moved into a position to engage the upper open ends of the articles in the finishing mold cavities.

The knock-out arms and their operating devices are shown in Figs. 27 to 37, inclusive, there being one arm arranged at each side of the finishing mold frame. Each arm carries a set of knock-out disks 300 fixed to the lower ends of tubular stems 301 which are slidable through guideways 302 extending through a head 303 which is preferably of hollow formation (Figs. 32 and 33) and is connected to a flexible air pressure supply pipe 304 which provides communication between the chambered head 303 and a high pressure air supply pipe 305 (Fig. 28) by way of the rock shaft 306 and flexible pipe 307 connected to the lower end of said rock shaft which is shown in Fig. 35 as provided with the central passageway 308 extending axially thereof.

The knock-out disks 300 are preferably formed with a series of radial grooves 309 to permit the escape of air which has been injected into the articles. Coil springs 310 encircle the tubular stems 301 between the head 303 and said disks serving to yieldably hold said disks in their lowermost positions while they are inactively positioned. The upper ends of these tubular stems 301 are threaded and carry stop nuts 311 which may be adjusted to vary the extent of downward movement of the knock-out disks relative to the head 303 and thereby regulate and vary the time interval between ejection of the bottles of a single group. This head 303 (Figs. 32, 33 and 34) is adapted to be seated in a frame 312 at one end of an arm 370 and held therein against accidental displacement by swinging bolts 313 having lock nuts 314 associated therewith. An arm 315 extends upwardly and forwardly over the head 303 (Fig. 34) and is rigidly connected at its forward end to the upper extremities of depending nozzles 316, the lower ends of the latter being tapered and adapted to project into the articles being blown as shown in Fig. 32.

Each of these nozzles 316 is formed with an axial passageway 317 terminating at a point within the chambered head 303 and communicating at this point with radial openings or ports 318. These radial openings 318 are adapted to be aligned at times with radial openings or ports 319 formed in the disk carrying stems 301 (Fig. 32). These radial openings or ports 319 in the disk carrying stems 301 communicate with the air pressure chamber 320 in the head 303 while the disks are seated upon articles in the finishing mold, providing communication between said air chamber and the passageways 317 through said nozzles to the interior of the articles. The relative size of the axial opening 317 and the grooves or exhaust ports 309 formed in the lower side of each knock-out disk is preferably such that when the radial openings 318 and 319 are aligned as shown in Fig. 32, and a predetermined constant pressure of air is injected into the articles, a certain degree of air pressure will be set up in the articles in the finishing mold to assist in final shaping and setting of the glass. With partial dis-alignment of said radial openings or ports 318 and 319, the rate at which the air enters the articles will be reduced to such an extent that it will escape through the grooves 309 without building up any substantial pressure, so that there will merely be provided a free circulation of cooling air and an absence of expanding degree of pressure. Thus, it is seen that the nozzles and tubular stems carrying the knock-out disks are so formed that air pressure is alternately applied to and cut off from the articles by relative movement between said nozzles and stems. This relative movement is obtained by actuation of a cam mechanism which will now be set forth.

As in the identified patent to Richard La France, the knock-out mechanism includes a rock shaft 306 movable axially, and rotatable in a supporting frame 325, there being one frame fixed to each side of the finishing mold frame 220. The rock shaft is formed with a pinion 326 running in mesh with a transverse rack bar 327 (Figs. 35 and 37), the latter carrying a cam roll running in a bayonet slot 328 formed in a face plate 329 on a frame 325. Longitudinal movement of the rock shaft and the slide 330 in which said shaft is held, causes movement of said rack bar 327 and rocking of the shaft 306, whereby the disk carrying head 303 is shifted laterally to a position at which the knock-out disks seat upon the articles in the finishing mold.

The lower end of the slide 330 which carries the rock shaft 306 is provided with a cam roll 331. A bell crank lever 332 is pivoted to a bracket 333 on the finishing mold frame 320 (Fig. 28). One arm of this bell crank lever 332 is bifurcated and straddles said cam roll 331 while its other end is provided with an axially movable cam roll 334, which is fixed to one end of a stem 335 (Fig. 29) slidably and rotatably connected to said crank arm. A coil spring 139 encircles said stem 335 serving to yieldably space said cam roll from its carrying arm. This cam roll 334 engages a stationary cam 337 on the arms 223 just after the finishing mold begins its lowering movement and simultaneously with complete seating of the group of knock-out disks upon the articles in the finishing mold.

The face of this cam 337 is formed with an offset 338 at its front end which serves to rock the bell crank lever 332 to thereby align the radial openings or ports 318 and 319 in the nozzles 316 and disk carrying stems 301 (Fig. 32), permitting application of air pressure internally of the ware. This air pressure is constant and of such a degree that a greater or less degree of pressure is set up within the articles even though the knock-out disks are provided with the escape ports or grooves 309. At a predetermined point, this offset 338 on the cam 337 is terminated and the face is recessed so that the rock shaft 306 is moved upwardly a sufficient distance to disalign said radial ports 318 and 319 to an extent decreasing the pressure of air in the articles so that there is merely a free circulation of cooling air for a predetermined period of time. The cam face is provided with another offset 339 at a point spaced from the first offset 338, this second offset being of substantially the same form as the first one and serving to align said ports so that air pressure may again be built up within the articles in the finishing mold cavities. The face of the cam 337 beyond the second offset 339 is so formed that the bell crank 332 is rocked upwardly a considerable distance to completely disalign the ports 318 and 319, cutting off the application of air to the articles and lifting the disks entirely away from the articles just after the finishing molds open at the ware ejecting station. Following this movement of the bell crank lever 332, the cam roll 334 rides up an inclined face 340 at a right angle to the cam face, causing axial movement of the cam roll (Fig. 29) whereby the latter clears the cam face and assumes a position above said cam 337 so that upon return of the finishing mold to the blank transfer station, the bell crank lever 332 will not be moved by the cam 337 but instead will remain stationary in its normal position wherein the rock shaft 306 occupies its lowermost position. Accordingly, the knock-out disks will be located at one side of the finishing molds during movement of the latter to the blank transfer station. Ware ejected from the finishing mold is received in a chute 360 (Fig. 1) and directed thereby to an endless conveyor 361 which, in turn, transfers the ware to the leer or any other desired point.

The supply body of glass from which charges are periodically gathered by the blank mold is contained in a furnace extension 350 (Fig. 1), including a transverse dam 351 which divides the extension into a charge gathering area and a cut-off receiving area. A reciprocating cover 352 is arranged over the extension and is adapted to be moved outwardly at certain periods in timed relation with movement of the gathering mold to cover the glass in both the gathering and cut-off areas and apply heat to said areas. This cover 352 is reciprocated by a pair of air motors, the supply of air to said motors being regulated by a control device 353 which is actuated by the main motor 98 through a series of interconnected shafts 354. One of these shafts 354 is splined to a bevel gear 355 and the gear bearing 356 permitting movement of the entire machine horizontally relative to the furnace extension without interfering with operation of the air motor control device 353.

Modifications may be resorted to within the spirit and scope of the appended claims.

What I claim is:

1. A glassware forming machine comprising stationary finishing mold and blank mold frames arranged in superposed relation, a finishing mold and a blank mold mounted on said frames, means to reciprocate the blank mold in its supporting frame, and means including air pressure and vacuum chambers in said blank mold frame permitting application of vacuum and air pressure to the mold during movement of the latter in one direction.

2. A glassware forming machine comprising stationary superposed blank mold and finishing mold frames, a blank mold mounted on the upper frame for substantially horizontal reciprocation thereon between a charge gathering station and a blank transfer station, a finishing mold hinged to the lower frame for vertical swinging between said blank transfer station and a ware ejecting station, cam mechanisms controlling movement of said molds, and a single motor causing continuous operation of the cam mechanisms.

3. A glassware forming machine comprising stationary superposed blank and finishing mold frames, a vacuum chamber at one side of the finishing mold frame, an air pressure chamber at the other side of said frame, a pair of hollow slideways on the blank mold frame, means providing communication between each slideway and one of said chambers, a blank mold, hollow supporting arms communicating with the interior of the blank mold and mounted in said slideways, means to reciprocate the mold between a charge gathering station and a blank transfer station, means including longitudinally spaced ports in the arms and slideways permitting application of vacuum and air pressure in succession to the blank mold just in advance of and during movement of the latter to the blank transfer station, and a finishing mold adapted to enclose formed blanks at said transfer station.

4. A glassware forming machine comprising stationary superposed blank and finishing mold frames, a vacuum chamber at one side of the finishing mold frame, an air pressure chamber at the other side of said frame, a pair of hollow slideways on the blank mold frame, means providing communication between each slideway and one of said chambers, a blank mold, hollow supporting arms communicating with the interior of the blank mold and mounted in said slideways, means to reciprocate the mold between a charge gathering station and a blank transfer station, means including longitudinally spaced ports in the arms and slideways permitting application of vacuum and air pressure in succession to the blank mold just in advance of and during movement of the latter to the blank transfer station, a finishing mold adapted to enclose formed blanks at said transfer station, and means providing communication between the air pressure chamber and the finishing mold to permit blowing of the blank to its final form in said finishing mold.

5. A glassware forming machine comprising stationary superposed blank and finishing mold frames, a vacuum chamber at one side of the finishing mold frame, an air pressure chamber at the other side of said frame, a pair of hollow slideways on the blank mold frame, means providing communication between each slideway and one of said chambers, a blank mold, hollow supporting arms communicating with the interior of the blank mold and mounted in said slideways, means to reciprocate the mold between a charge gathering station and a blank transfer station, means including longitudinally spaced ports in the arms and slideways permitting application of vacuum and air pressure in succession to the blank mold just in advance of and during movement of the latter to the blank transfer station, a finishing mold adapted to enclose formed blanks at said transfer station, and automatic means to blow the blank to its final shape in the finishing mold by a series of applications of air pressure.

6. A glassware forming machine comprising a stationary support, a blank mold slidably mounted on said support, means for slidably moving said mold between charge gathering and blank transfer stations, a finishing mold mounted for up and down movement, means for moving the finishing mold between said transfer station and a ware ejecting station, means to complete formation of a blank in said blank mold while the latter is moving from the charge gathering station to the blank transfer station, automatic means to transfer a blank to the finishing mold, and means to apply varying degrees of air pressure in succession to the blank at the transfer station and during lowering of the finishing mold to the ware ejecting station.

7. In a glassware forming machine, a stationary support, a blank mold mounted on said support and reciprocable thereon between horizontally spaced charge gathering and blank transfer stations, a finishing mold mounted for oscillatory movement vertically on said support between the transfer station and a ware ejecting station, means to transfer a blank from the blank mold to the finishing mold at said transfer station, means to expand the parison at the transfer station while in the finishing mold, and means to apply additional air pressure to the interior of the blank after expansion thereof.

8. In a glassware forming machine, a stationary support, a blank mold, means for moving the blank mold between gathering and transfer stations, a finishing mold mounted on the support for oscillatory movement vertically, means for moving said finishing mold between a blank transfer station and a ware ejecting station, means to transfer a blank to the finishing mold at the transfer station, means to expand the blank in the finishing mold at the transfer station, and means to apply additional successively varying degrees of air pressure to the interior of the blank after the expanding operation.

9. In a glassware forming machine, a stationary support, a blank mold thereon, means for moving the blank mold between gathering and transfer stations, a finishing mold mounted on the support for oscillatory movement vertically, means for moving said finishing mold between a blank transfer station and a ware ejecting station, means to transfer a blank to the finishing mold at the transfer station, means to expand the blank in the finishing mold at the transfer station, and means to alternately apply air pressure and freely circulating air to the interior of the blank after the expanding operation.

10. In a glassware forming machine, a mold carriage, a blank mold mounted on and reciprocable on said carriage, means for reciprocating said mold between a charge gathering station and a blank transfer station, a finishing mold mounted on said carriage to swing up and down, means for swinging said finishing mold between said blank transfer station and a ware ejecting station, means to transfer a blank to the finishing mold at said transfer station, means to blow the blank to its final shape in the finishing mold at the transfer station, and means to apply additional air under pressure and freely circulating cooling air in alternation to the article during downward movement of the finishing mold.

11. In a glassware forming machine, a stationary support, a blank mold mounted on and reciprocable on said support, means for reciprocating the mold between a charge gathering station and a blank transfer station, a finishing mold mounted on said support to swing up and down, means for swinging the finishing mold between said blank transfer station and a ware ejecting station, means to transfer a blank to the finishing mold at said transfer station, and means to blow the blank to its final shape in the finishing mold by a series of applications of air under pressure prior to and during downward movement of the finishing mold, said applications of air being of varying degrees in a predetermined order.

12. A glassware forming machine including a stationary support, a blank mold on said support, means to reciprocate said mold on the support between charge gathering and blank transfer stations, means to form a blank in said mold, a finishing mold on said support to enclose blanks at the transfer station, means to move said finishing mold between said transfer station and a ware ejecting station, means to blow a blank to its final form in the finishing mold at said transfer station, and means causing free circulation of cooling air through the blown blank in the finishing mold during movement of the latter to the ware ejecting station.

13. A glassware forming machine comprising a mold carriage, a blank mold slidably mounted on said carriage, means for slidably moving said mold between a charge gathering station and a blank transfer station, a finishing mold mounted to swing up and down, means for swinging the mold between said transfer station and a ware ejecting station, means to complete formation of a blank in said blank mold while the latter is moving from the charge gathering to the blank transfer station, automatic means to transfer the blank to the finishing mold, means to blow the blank to its final form at said blank transfer station, and means to apply freely circulating cooling air internally of the blown blank in the finishing mold during lowering of the latter.

14. In a glassware forming machine, a finishing mold, means for moving the mold between a blank transfer station and a ware ejecting station, a knock-out disk arranged to seat upon an article in the finishing mold during movement of the latter to the ware ejecting station, and means causing free circulation of cooling air through the article in the mold by way of said disk.

15. In a glassware forming machine, a finishing mold, means adapted to swing the mold vertically between a blank transfer station and a ware ejecting station, means to blow a blank to its final form at the transfer station, and means to cause free circulation of cooling air through the blown blank during movement of the latter with the mold to said ware ejecting station.

16. In a glassware forming machine, a stationary support, a blank mold mounted for reciprocation on the support between a charge gathering station and a blank transfer station, means to complete formation of a blank in said blank mold during movement of the latter to the transfer station, a finishing mold to enclose the blank at said transfer station, means to blow the blank to its final form in the finishing mold at said transfer station, means to lower the finishing mold to a ware ejecting station, and means to cause free circulation of cooling air through the blown blank in the finishing mold during said lowering of the latter.

17. In a glassware forming machine, a stationary support, a blank mold thereon, means for moving the mold between gathering and transfer stations, a pair of hollow arms slidably mounting said mold on the support and communicating with the interior of the mold, and means for alternately applying vacuum and air pressure to the blank mold through said hollow arms.

18. In a glassware forming machine, a stationary support, a blank mold slidable substantially horizontally thereon, means for moving the mold between a charge gathering station and a blank transfer station, air pressure and vacuum chambers on said support, and means controlled by movement of the blank mold to apply vacuum and air pressure in succession to the mold during the charge gathering period and during movement of said mold to the transfer station.

19. In a glassware forming machine, a stationary support, a blank mold, a pair of elongated mold supporting arms slidably mounting said mold on the support and having chambers therein communicating with the interior of the mold, means to reciprocate said mold on the support between a charge gathering station and a blank transfer station, means to apply vacuum to the mold through one of said arms while the mold is at the gathering station, and means actuated by movement of the mold away from the gathering station to shut off the application of vacuum and cause application of air pressure to the mold through the other arm.

20. In a glassware forming machine, a stationary support, a blank mold, a pair of elongated mold supporting arms slidably mounting said mold on the support and having chambers therein communicating with the interior of the mold, means to reciprocate said mold on the support between a charge gathering station and a blank transfer station, means to apply vacuum to the mold through one of said arms while the mold is at the gathering station, means actuated by movement of the mold away from the gathering station to shut off the application of vacuum and cause application of air pressure to the mold through the other arm, and manually adjustable means to change the period of application of air pressure to the mold.

21. In a glassware forming machine, a stationary support, a blank mold, a pair of elongated mold supporting arms slidably mounting said mold on the support and having chambers therein communicating with the interior of the mold, means to reciprocate said mold on the support between a charge gathering station and a blank transfer station, means to apply vacuum to the mold through one of said arms while the mold is at the gathering station, means actuated by movement of the mold away from the gathering station to shut off the application of vacuum and cause application of air pressure to the mold through the other arm, and means to change the timed relation between the applications of vacuum and air pressure to the mold.

22. In a glassware forming machine, a stationary support, a blank mold, a pair of hollow supporting arms for the mold slidable on said support, means for sliding the mold and supporting arms between a charge gathering station and a blank transfer station, a valved port providing communication between the interior of one arm and the mold cavity, means to supply air pressure to said one arm, a plunger reciprocable into and out of said mold cavity, means to apply vacuum to the cavity through the other arm while the plunger is projected thereinto, means to shut off vacuum at a predetermined time following the charge gathering operation and to simultaneously retract said plunger, and cam means causing opening of said valve after the vacuum has been shut off.

23. In a glassware forming machine, a stationary support, a blank mold, a pair of hollow supporting arms for the mold slidable on said support, means for reciprocating said mold and arms between a charge gathering station and a blank transfer station, a valved port providing communication between the interior of one arm and the mold cavity, means to supply air pressure to said one arm, a plunger reciprocable into and out of said mold cavity, means to apply vacuum to the cavity through the other arm while the plunger is projected thereinto, means to shut off vacuum at a predetermined time following the charge gathering operation and to simultaneously retract said plunger, cam means causing opening of said valve after vacuum has been shut off, and means to change the timed relation between termination of the application of vacuum and the application of air pressure.

24. In a glassware forming machine, a stationary support, a blank mold, a pair of hollow supporting arms for the mold slidable on said support, means for reciprocating said mold and arms between a charge gathering station and a blank transfer station, a valved port providing communication between the interior of one arm and the mold cavity, means supplying air pressure to said one arm, a plunger reciprocable into and out of said mold cavity, means to apply vacuum to the cavity through the other arm while the plunger is projected thereinto at the charge gathering station, means to shut off vacuum at a predetermined time following the charge gathering operation and to simultaneously retract said plunger, a rock arm controlling movement of the plunger, a cam adapted to periodically rock said arm to move the plunger into or out of the mold cavity, a rock arm operatively connected to said valve, and a cam arranged to rock said arm to open the valve after the plunger has been retracted.

25. In a glassware forming machine, a stationary support, a blank mold, a pair of hollow supporting arms for the mold slidable on said support, means for reciprocating the mold and arms between a charge gathering station and a blank transfer station, a valved port providing communication between the interior of one arm and the mold cavity, means supplying air pressure to said one arm, a plunger reciprocable into and out of said mold cavity, means to apply vacuum to the cavity through the other arm while the plunger is projected thereinto at the charge gathering station, means to shut off vacuum at a predetermined time following the charge gathering operation and to simultaneously retract said plunger, a rock arm controlling movement of the plunger, a cam adapted to periodically rock said arm to move the plunger into or out of the mold cavity, a rock arm operatively connected to said valve, a cam arranged to rock said arm to open the valve after the plunger has been retracted permitting application of air pressure to the mold, and means to vary the spaced relation between operation of the rock arm actuating cams to thereby change the timed relation between lifting of the plunger and application of air pressure to the mold.

26. In a glassware forming machine, a stationary support, a blank mold thereon, means for moving the blank mold between gathering and transfer stations, a finishing mold mounted to swing up and down on the support below said blank mold, means for swinging the finishing mold between said stations, means to transfer a blank from the blank mold to the finishing mold at the predetermined blank transfer station, means to blow the blank to its final form in the finishing mold at said station, and means including a knock-out disk formed with an air conduit therethrough to apply freely circulating air internally of the blown blank during downward movement of the finishing mold.

27. In a glassware forming machine, means to form a parison, means to place the parison at a transfer station, a finishing mold to enclose the parison at said transfer station, means for moving the finishing mold between the transfer station and a discharge station, and means including a knock-out disk having an opening therein to apply air under pressure and freely circulating air to the finishing mold in alternation to blow the blank to its final form.

28. In a glassware forming machine, a mold carriage, a finishing mold mounted on said carriage for swinging movement, means for swinging the mold between a blank transfer station and a ware ejecting station, a knock-out disk adapted to be seated upon the open upper end of a blank in said mold during movement of the mold to the ware ejecting station, said knock-out disk having an axial passageway opening into the upper end of the blank and radial exhaust ports on its face adjacent said blank, and means to inject air into the blank at successively varying degrees of pressure to blow the blank to its final form.

29. In a glassware forming machine, a mold carriage, a finishing mold mounted thereon to swing up and down, means for swinging the mold between a blank transfer station and a ware ejecting station, a knock-out arm mounted to oscillate on said finishing mold, a knock-out disk carried by said arm and seatable on the upper end of the blank during downward movement of the finishing mold, an axial passageway through said disk opening into the upper end of the blank, means to apply air pressure to the blank through said passageway to blow said blank to its final form, and a valve controlled by the position of the knock-out arm to alternately increase and decrease the pressure of air applied to the blank.

30. In a glassware forming machine, a mold carriage, a finishing mold mounted thereon, means for moving the mold between a blank transfer station and a ware ejecting station, a knock-out disk adapted to seat upon the upper end of a blank in said finishing mold during movement of the latter to the ware ejecting station, a movable carrier for said disk mounted on the finishing mold, an air pressure chamber embodied in the carrier, a sleeve slidably projecting through said air chamber and connected at its lower end to the knock-out disk, a hollow stem extending through said sleeve and knock-out disk and normally held stationary relative to the disk carrier, and radial ports in said stem and sleeve alignable with each other at times within the air chamber providing communication between said chamber and the interior of a parison whereby air pressure may be applied to the parison to blow it to its final form in the finishing mold.

31. In a glassware forming machine, a mold carriage, a finishing mold mounted thereon and movable between a blank transfer station and a ware ejecting station, a knock-out disk adapted to seat upon the upper end of a blank in said finishing mold during movement of the latter to the ware ejecting station, a movable carrier for said disk mounted on the finishing mold, an air pressure chamber embodied in the carrier, a sleeve slidably projecting through said air chamber and connected at its lower end to the knock-out disk, a hollow stem extending through said sleeve and knock-out disk and normally held stationary relative to the disk carrier, radial ports in said stem and sleeve alignable with each other at times within the air chamber and providing communication between said chamber and the interior of a parison whereby air pressure may be applied to the parison to blow it to its final form in the finishing mold, and spring means normally holding said sleeve and stem in position to dis-align said radial ports.

32. In a glassware forming machine, a mold carriage, a finishing mold mounted thereon and movable between a blank transfer station and a ware ejecting station, a knock-out disk adapted to seat upon the upper end of a blank in said finishing mold during movement of the latter to the ware ejecting station, a movable carrier for said disk mounted on the finishing mold, an air pressure chamber embodied in the carrier, a sleeve slidably projecting through said air chamber and connected at its lower end to the knock-out disk, a hollow stem extending through said sleeve and knock-out disk and normally held stationary relative to the disk carrier, radial ports in said stem and sleeve alignable with each other at times within the air chamber providing communication between said chamber and the interior of a parison whereby air pressure may be applied to the parison to blow it to its final form in the finishing mold, and means to control and vary the degree of relative movement between said stem and sleeve to thereby vary the degree of applied air pressure.

33. In a glassware forming machine, a mold carriage, a finishing mold mounted on the carriage for vertical swinging movement, means for swinging the mold between a blank transfer station and a ware ejecting station, a knock-out arm oscillatively mounted on said finishing mold, cam mechanism for oscillating the knock-out arm and moving the arm longitudinally of the axis of oscillation, an air pressure chamber carried by the knock-out arm, a knock-out disk having an opening therethrough and adapted to seat upon the upper end of the blank in the mold during movement of the mold to the ware ejecting station, a tubular member slidable through the air chamber and connected to said disk, and means controlled by the relative positions of said air pressure chamber and knock-out disk to cause application of successively varying degrees of air pressure to the blank through said disk.

34. In a glassware forming machine, a stationary support, a pair of horizontally spaced guide rails thereon, a partible blank mold, a pair of arms supporting said blank mold and slidably mounted on said guide rails, rack and pinion mechanism operable to reciprocate said arms causing periodic movement of the mold between a charge gathering station and a blank transfer station, automatic means to completely open the blank mold just prior to arrival of the mold at the blank transfer station, and manually controlled means to change the point of initial opening and closing of the blank mold.

35. In a glassware forming machine, a stationary support, a pair of horizontally spaced inclined guide rails on said support, a partible blank mold, a partible neck mold associated with said blank mold, a pair of mold supporting arms slidable on the guide rails, automatic means to reciprocate said arms to move the mold between a charge gathering station and a blank transfer station, a finishing mold mounted on said support and movable vertically between said blank transfer station and a ware ejecting station, means to simultaneously move said molds to the blank transfer station, means to open the blank mold in advance of arrival at said station permitting the finishing mold to enclose a blank suspended from the neck mold, and automatic means to open the neck mold following enclosure of the blank in the finishing mold.

36. In a glassware forming machine, a stationary support, a pair of horizontally spaced inclined guide rails on said support, a partible blank mold, a partible neck mold associated with said blank mold, a pair of mold supporting arms carrying the blank and neck molds and slidable on the guide rails, automatic means to reciprocate said arms to move the molds between a charge gathering station and a blank transfer station, a finishing mold mounted on said support in a plane below said guide rails and movable between said blank transfer station and a ware ejecting station, means to simultaneously move said blank, neck and finishing molds to the blank transfer station, means to open the blank mold in advance of arrival at said station, means to cause the finishing mold to enclose a blank suspended from the neck mold, automatic means to open the neck mold following enclosure of the blank in the finishing mold, and means to apply air pressure to the blank during movement of the finishing mold to the ware ejecting station to thereby blow said blank to its final form.

37. In a glassware forming machine, a stationary support, a pair of horizontally spaced inclined guide rails on said support, a partible blank mold, a partible neck mold associated with said blank mold, a pair of mold supporting arms slidable on the guide rails, automatic means to reciprocate said arms to move the mold between a charge gathering station and a blank transfer station, a finishing mold mounted on said support and movable between said blank transfer station and a ware ejecting station, means to simultaneously move said molds to the blank transfer station, means to open the blank mold in advance of arrival at said station permitting the finishing mold to enclose a blank suspended from the neck mold, automatic means to open the neck mold following enclosure of the blank in the finishing mold, automatic means to blow the blank to its final form at the transfer station, and means to freely circulate cooling air through the blown blank during movement of the finishing mold to the ware ejecting station.

Signed at Toledo, in the county of Lucas and State of Ohio, this 28th day of June, 1927.

LEONARD D. SOUBIER.